United States Patent
Furuhashi et al.

(10) Patent No.: US 12,033,662 B2
(45) Date of Patent: Jul. 9, 2024

(54) MAGNETIC DISK DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Kana Furuhashi, Kawasaki Kanagawa (JP); Hiroyuki Takeda, Tokyo (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 235 days.

(21) Appl. No.: 17/462,379

(22) Filed: Aug. 31, 2021

(65) Prior Publication Data
US 2022/0301590 A1    Sep. 22, 2022

(30) Foreign Application Priority Data

Mar. 18, 2021 (JP) ................................. 2021-044666

(51) Int. Cl.
*G11B 20/18* (2006.01)
*G11B 20/12* (2006.01)

(52) U.S. Cl.
CPC ...... *G11B 20/1889* (2013.01); *G11B 20/1258* (2013.01); *G11B 20/1833* (2013.01); *G11B 20/1866* (2013.01); *G11B 2020/1222* (2013.01); *G11B 2020/1232* (2013.01); *G11B 2020/1238* (2013.01)

(58) Field of Classification Search
CPC ............. G06F 11/1044; G06F 11/1048; G11B 20/1258; G11B 20/1833; G11B 20/1866; G11B 20/1889; G11B 2020/1222; G11B 2020/1232; G11B 2020/1238

See application file for complete search history.

(56) References Cited

U.S. PATENT DOCUMENTS

| | | | |
|---|---|---|---|
| 5,596,709 A | 1/1997 | Bond et al. | |
| 5,701,304 A * | 12/1997 | Glover | G11B 20/1883 |
| 5,751,733 A * | 5/1998 | Glover | G11B 20/1866 |
| | | | 714/766 |
| 5,864,440 A * | 1/1999 | Hashimoto | G11B 27/36 |
| | | | 360/49 |
| 6,219,800 B1 * | 4/2001 | Johnson | G06F 11/1076 |
| | | | 714/6.32 |
| 7,702,954 B2 * | 4/2010 | Yoshida | G11B 20/1833 |
| | | | 714/54 |

(Continued)

*Primary Examiner* — April Y Blair
*Assistant Examiner* — Enamul M Kabir
(74) *Attorney, Agent, or Firm* — Kim & Stewart LLP

(57) ABSTRACT

A magnetic disk device includes a disk including a plurality of error sectors including a defect, a first track having a first parity sector, and a controller. The controller is configured to, upon receiving a write command to write first data in a first region of a portion of the first track, which is a portion of the first track, first perform an XOR operation on all sectors of the first track other than one or more sectors of the first region and the first parity sector of the first track, and then write the first data in the one or more sectors of the first region, perform a second XOR operation on the one or more sectors of the first region and the result of the first XOR operation, and write the result of the second XOR operation in the first parity sector.

20 Claims, 14 Drawing Sheets

(56) References Cited

U.S. PATENT DOCUMENTS

| | | | |
|---|---|---|---|
| 7,911,725 B2 | 3/2011 | Yoshida et al. | |
| 9,411,685 B2 * | 8/2016 | Lee | G06F 11/1076 |
| 9,489,260 B1 * | 11/2016 | Hong | G06F 3/064 |
| 10,140,180 B1 * | 11/2018 | Sridhara | H03M 13/29 |
| 10,720,177 B1 * | 7/2020 | Ng | G11B 5/012 |
| 2007/0022359 A1 * | 1/2007 | Katoh | G11B 20/1833 |
| | | | 714/769 |
| 2012/0154947 A1 | 6/2012 | Cho et al. | |
| 2017/0200470 A1 * | 7/2017 | Kojima | G11B 5/5547 |
| 2017/0270963 A1 * | 9/2017 | Maeto | G11B 20/1833 |
| 2019/0279678 A1 * | 9/2019 | Maruyama | G11B 19/045 |
| 2019/0378543 A1 * | 12/2019 | Maeto | G11B 21/08 |

* cited by examiner

MAGNETIC DISK DEVICE

CROSS-REFERENCE TO RELATED APPLICATION(S)

This application is based upon and claims the benefit of priority from Japanese Patent Application No. 2021-044666, filed on Mar. 18, 2021, the entire contents of which are incorporated herein by reference.

FIELD

Embodiments described herein relate generally to a magnetic disk device.

BACKGROUND

When a magnetic disk device cannot read a predetermined sector, the magnetic disk device corrects this sector based on a correction code added to the sector and reads this sector again. When this sector cannot be corrected by the correction code corresponding to this sector, the magnetic disk drive may have an error correction function that corrects this sector based on a parity sector corresponding to a track including this sector. The magnetic disk device writes the result of an exclusive OR (XOR) operation of sectors of a predetermined track as the parity sector of that track. When writing (or overwriting) a portion of the sector of the predetermined track, the magnetic disk device performs a read-modify-write to read this track and rewrite the parity sector.

DETAILED DESCRIPTION

Embodiments provide a magnetic disk device capable of improving a processing performance.

In general, according to one embodiment, a magnetic disk device includes a disk including a plurality of error sectors including a defect, a first track having a first parity sector, a second track having a second parity sector, and a media cache, a head configured to write data in the disk and read data from the disk, and a controller. The controller is configured to, upon receiving a write command to write first data in one or more sectors in a first region, which is a portion of the first track, perform a first XOR operation on all sectors of the first track other than the one or more sectors of the first region and the first parity sector of the first track, and then write the first data in the one or more sectors the first region, and perform a second XOR operation on the first data and the result of the first XOR operation, and write the result of the second XOR operation in the first parity sector.

Hereinafter, embodiments will be described with reference to the accompanying drawings which are merely examples and do not limit the scope of the present disclosure.

Embodiments

Figure 1:
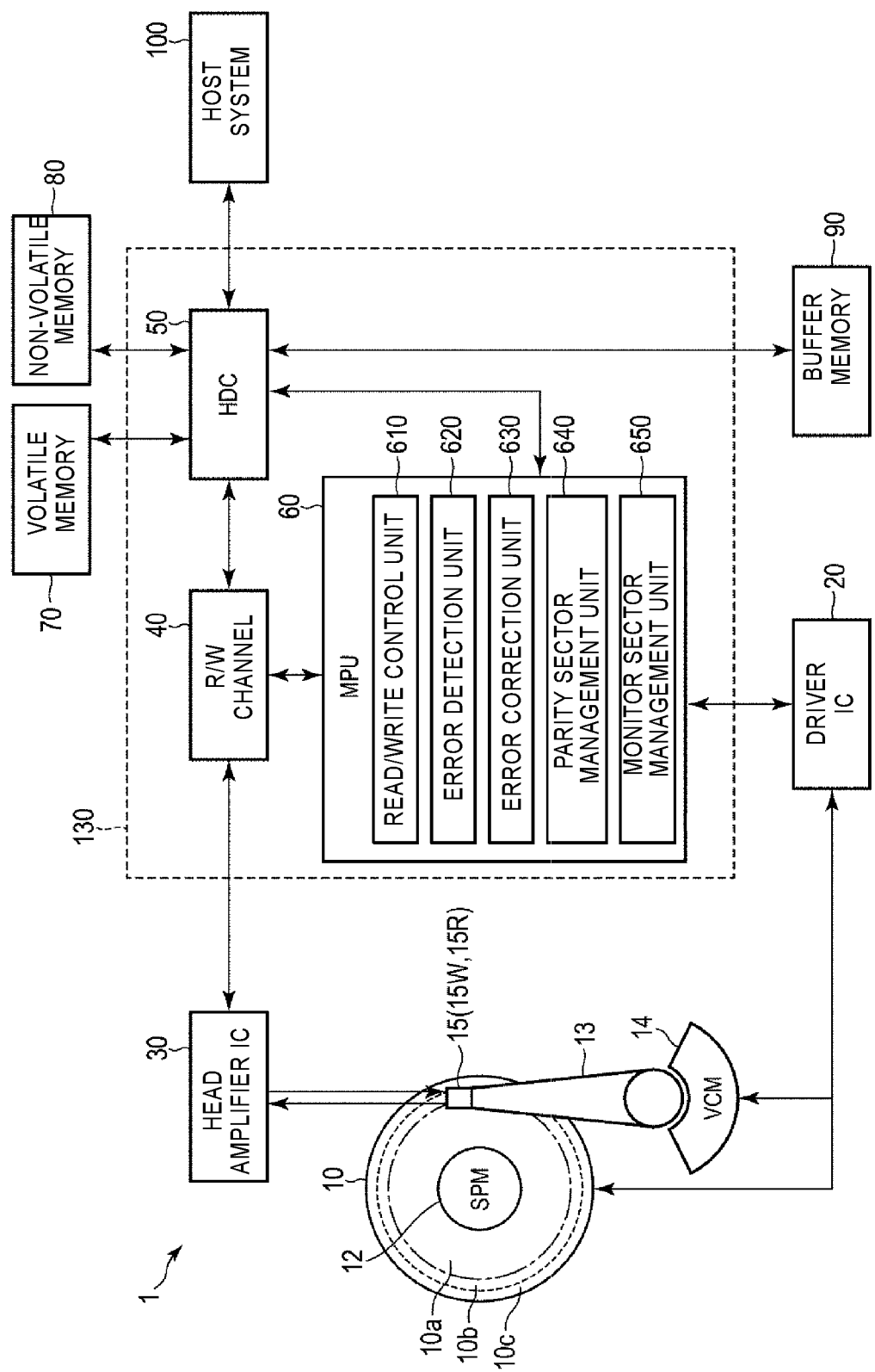
FIG. 1 is a block diagram illustrating the configuration of a magnetic disk device according to an embodiment.

FIG. 1 is a block diagram illustrating the configuration of a magnetic disk device 1 according to an embodiment. The magnetic disk device 1 includes a head disk assembly (HDA), a driver IC 20, a head amplifier integrated circuit (hereinafter, a head amplifier IC or a preamplifier) 30, a volatile memory 70, a non-volatile memory 80, and a buffer memory (buffer) 90, and a system controller 130 that is a one-chip integrated circuit, all of which will be described later. Further, the magnetic disk device 1 is connected to a host system (hereinafter, simply referred to as a host) 100.

The HDA includes a magnetic disk (hereinafter, referred to as a disk) 10, a spindle motor (hereinafter, referred to as an SPM) 12, an arm 13 on which a head 15 is mounted, and a voice coil motor (hereinafter, referred to as a VCM) 14. The disk 10 is attached to the SPM 12 and is rotated by the SPM 12. The arm 13 and the VCM 14 constitute an actuator. The actuator controls the movement of the head 15 mounted on the arm 13 to a predetermined position on the disk 10 by the VCM 14. The number of disks 10 and the number of heads 15 may be two or more.

The disk 10 is allocated with a user data area 10a, a media cache (or sometimes referred to as a media cache area) 10b in which data (or a command) from the host are temporarily stored before being transferred to a predetermined area of the user data area 10a, and a system area 10c in which information necessary for system management is written. The media cache 10b does not have to be disposed on the disk 10. Hereinafter, a direction from the inner circumference of the disk 10 to the outer circumference thereof or a direction from the outer circumference of the disk 10 to the inner circumference thereof is referred to as a radial direction. In the radial direction, the direction from the inner circumference to the outer circumference is referred to as an outer direction, and the direction from the inner circumference to the outer circumference is referred to as an inner direction. A direction orthogonal to the radial direction of the disk 10 is referred to as a circumferential direction. The circumferential direction corresponds to a direction along the circumference of the disk 10. Further, a predetermined position in the radial direction of the disk 10 may be referred to as a radial position, and a predetermined position in the circumferential direction of the disk 10 may be referred to as a circumferential position. The radial position and the circumferential position may be collectively simply referred to as a position. The "track" is used as one of a plurality of areas divided in the radial direction of the disk 10, a path of the head 15 at a predetermined radial position, data extending in the circumferential direction of the disk 10, one lap of data written on a track of a predetermined radial position, data written on a predetermined track on the disk 10, a portion of data written on a predetermined track on the disk 10, and other various meanings. The "sector" is used as one of a plurality of areas in which a predetermined track of the disk 10 is divided in the circumferential direction, data written at a predetermined circumferential position in a predetermined radial position of the disk 10, data written in a predetermined sector of a predetermined track of the disk 10, and other various meanings. A "width of track in the radial direction" may be referred to as a "track width". A "path passing through the center position of the track width in a predetermined track" is referred to as a "track center".

The head 15 has a slider as a main body and includes a write head 15W and a read head 15R mounted on the slider. The write head 15W writes data in the disk 10. The read head 15R reads data written in the disk 10. In addition, the "write head 15W" may be simply referred to as a "head 15", the "read head 15R" may be simply referred to as a "head 15", and the "write head 15W and read head 15R" may be collectively referred to as a "head 15". The "center of the head 15" may be referred to as a "head 15", the "center of the write head 15W" may be referred to as a "write head 15W", and the "center of the read head 15R" may be referred to as a "read head 15R". The "center of the write head 15W" may be simply referred to as a "head 15", and the "center of the read head 15R" may be simply referred to as a "head 15". "Positioning the center of the head 15 at the track center of a predetermined track" may be expressed as "positioning the head 15 at a predetermined track", "arranging the head 15 on a predetermined track", or "locating the head 15 on a predetermined track".

Figure 2:
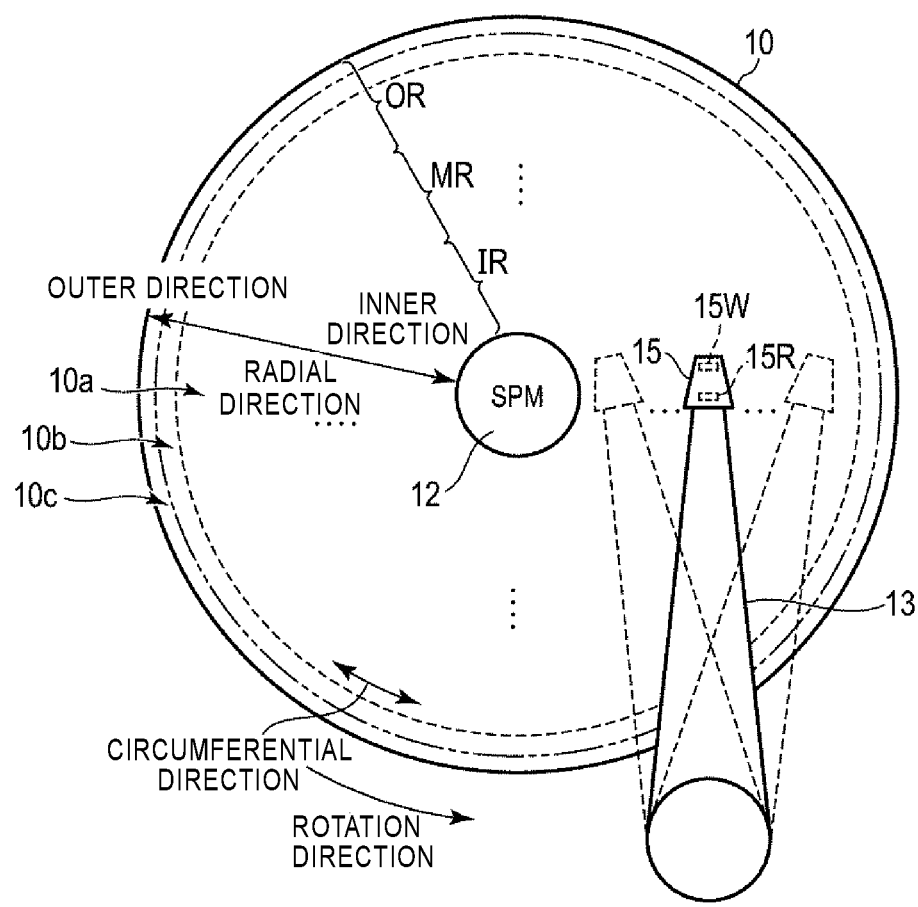
FIG. 2 is a schematic diagram illustrating an example of a disk according to the embodiment.

FIG. 2 is a schematic view illustrating an example of the disk 10 according to the present embodiment. As illustrated in FIG. 2, a direction in which the disk 10 rotates in the circumferential direction is referred to as a rotation direction. In the example illustrated in FIG. 2, the rotation direction is illustrated counterclockwise, but may be in the opposite direction (clockwise). In FIG. 2, the disk 10 is divided into an inner peripheral region IR located in the inner direction, an outer peripheral region OR located in the outer direction, and a middle region MR located between the inner peripheral region IR and the outer peripheral region OR.

In the example illustrated in FIG. 2, the disk 10 includes the user data area 10a, the media cache 10b, and the system area 10c. In FIG. 2, the user data area 10a, the media cache 10b, and the system area 10c are arranged in the order described toward the outer direction. In FIG. 2, the media cache 10b is disposed adjacent to the user data area 10a in the outer direction. In other words, the media cache 10b is disposed between the user data area 10a and the system area 10c. Here, "adjacent" includes not only the fact that data, objects, areas, and spaces are disposed in contact with each other, but also the fact that they are arranged at a predetermined interval. In FIG. 2, the system area 10c is disposed adjacent to the media cache 10b in the outer direction. The order of arrangement of the user data area 10a, the media cache 10b, and the system area 10c is not limited to the order illustrated in FIG. 2, but may be any order. Further, when the media cache 10b is not disposed on the disk 10, the system area 10c may be disposed adjacent to the user data area 10a in the outer direction.

In the example illustrated in FIG. 2, the user data area 10a is disposed over a range from the inner peripheral region IR to the outer peripheral region OR in the radial direction. In the example illustrated in FIG. 2, the media cache 10b is disposed in the outer peripheral region OR in the radial direction. The media cache 10b may be located in the inner peripheral region IR or the middle region MR. Further, the media cache 10b may be dispersedly located in the outer peripheral region OR, the middle region MR, and the inner peripheral region IR. In the example illustrated in FIG. 2, the system area 10c is disposed in the outer peripheral region OR in the radial direction. In other words, the system area 10c is disposed over a range from a predetermined position of the outer peripheral region OR to the outermost circumference of the disk 10. The system area 10c may be disposed in the middle region MR or the inner peripheral region IR.

In the user data area 10a of the disk 10, data may be written in a shingled magnetic recording (SMR) or shingled write recording (SWR) format in which a track to be next written is overwritten on a portion of a predetermined track in the radial direction. Meanwhile, in the user data area 10a, a track radially adjacent to a predetermined track (which may hereinafter be referred to as an adjacent track) is written at a predetermined interval from the predetermined track in the radial direction, or data may be written in a conventional magnetic recording (CMR) format in which data may be randomly written. Hereinafter, "writing data in a shingled magnetic recording format" may be referred to simply as "shingled magnetic recording", "performing a shingled magnetic recording process", or simply "writing". A write process other than a "conventional magnetic recording process" may be referred to as a "shingled magnetic recording process". In addition, "writing data in a conventional magnetic recording format" may be referred to simply as "conventional magnetic recording", "performing a conventional magnetic recording process", or simply "writing".

As illustrated in FIG. 2, the head 15 is rotated around a rotation axis with respect to the disk 10 by the VCM 14, so that the head 15 is moved from the inner direction to the outer direction and is disposed at a predetermined position. Alternatively, the head 15 is moved from the outer direction to the inner direction and is disposed at a predetermined position.

The driver IC 20 controls the SPM 12 and the VCM 14 according to the control of the system controller 130 (specifically, an MPU 60 to be described later). The head amplifier IC (preamplifier) 30 includes a read amplifier and a write driver. The read amplifier amplifies a read signal read from the disk 10 and outputs the amplified read signal to the system controller 130 (specifically, a read/write (R/W) channel 40 to be described later). The write driver outputs a write current, which corresponds to a signal output from the R/W channel 40, to the head 15.

The volatile memory 70 is a semiconductor memory in which stored data are lost when the power supply is cut off.

The volatile memory 70 stores data required for a process in each unit of the magnetic disk device 1. The volatile memory 70 is, for example, a dynamic random access memory (DRAM) or a synchronous dynamic random access memory (SDRAM).

The non-volatile memory 80 is a semiconductor memory that retains stored data even when the power supply is cut off. The non-volatile memory 80 is, for example, a NOR type or NAND type flash ROM (Flash Read Only Memory: FROM).

The buffer memory 90 is a semiconductor memory that temporarily records data transmitted and received between the magnetic disk device 1 and the host 100. The buffer memory 90 may be integrated with the volatile memory 70. The buffer memory 90 is, for example, a DRAM, a static random access memory (SRAM), an SDRAM, a ferroelectric random access memory (FeRAM), or a magnetoresistive random access memory (MRAM).

The system controller (controller) 130 is implemented by using, for example, a large-scale integrated circuit (LSI) called a System-on-a-Chip (SoC) in which a plurality of elements is integrated on a single chip. The system controller 130 includes a read/write (R/W) channel 40, a hard disk controller (HDC) 50, and a microprocessor (MPU) 60. The system controller 130 is electrically connected to, for example, the driver IC 20, the head amplifier IC 30, the volatile memory 70, the non-volatile memory 80, the buffer memory 90, and the host system 100.

The R/W channel 40 performs signal processing on data transferred from the disk 10 to the host 100 (which may hereinafter be referred to as read data) and data transferred from the host 100 (which may hereinafter be referred to as write data) according to an instruction from the MPU 60 to be described later. The R/W channel 40 has a circuit or function of modulating the write data. The R/W channel 40 has a circuit or function for measuring and demodulating the signal quality of the read data. The R/W channel 40 is electrically connected to, for example, the head amplifier IC 30, the HDC 50, and the MPU 60.

The HDC 50 controls the transfer of data. For example, the HDC 50 controls the transfer of data between the host 100 and the disk 10 according to an instruction from the MPU 60 to be described later. The HDC 50 is electrically connected to, for example, the R/W channel 40, the MPU 60, the volatile memory 70, the non-volatile memory 80, and the buffer memory 90.

The MPU 60 is a main controller that controls each unit of the magnetic disk device 1. The MPU 60 controls the VCM 14 via the driver IC 20 to execute servo control for positioning the head 15. The MPU 60 controls the SPM 12 via the driver IC 20 to rotate the disk 10. The MPU 60 controls the operation to write data in the disk 10 and selects a storage destination of data transferred from the host 100, for example, the write data. Further, the MPU 60 controls the operation to read data from the disk 10 and controls the processing of data transferred from the disk 10 to the host 100, for example, the read data. Further, the MPU 60 manages a region in which data are recorded. The MPU 60 is connected to each unit of the magnetic disk device 1. The MPU 60 is electrically connected to, for example, the driver IC 20, the R/W channel 40, and the HDC 50.

The MPU 60 has a read/write control unit 610, an error detection unit 620, an error correction unit 630, a parity sector management unit 640, and a monitor target sector management unit 650. The MPU 60 performs processes of various units, for example, the read/write control unit 610, the error detection unit 620, the error correction unit 630, the parity sector management unit 640, and the monitor target sector management unit 650 by executing firmware. The Alternatively, the various units of the MPU 60, for example, the read/write control unit 610, the error detection unit 620, the error correction unit 630, the parity sector management unit 640, and the monitor target sector management unit 650 may be implemented as circuits. The read/write control unit 610, the error detection unit 620, the error correction unit 630, the parity sector management unit 640, and the monitor target sector management unit 650 may be provided in the R/W channel 40 or the HDC 50.

The read/write control unit 610 controls a read process of reading data from the disk 10 and a write process of writing data in the disk 10 according to a command from the host 100. The read/write control unit 610 controls the VCM 14 via the driver IC 20 to position the head 15 at a predetermined position on the disk 10, and executes the read process or the write process. Hereinafter, the term "access" may be used to mean to include recording or writing data in a predetermined region (or the write process), reading data from a predetermined region (or the read process), and moving the head 15 to a predetermined region.

The read/write control unit 610 performs a write process in the conventional magnetic recording (CMR) format in which, for example, a predetermined interval (gap) is put from a predetermined track or a predetermined sector in the radial direction and data are written in another track adjacent to the predetermined track (which may hereinafter be also referred to as an adjacent track) or another sector adjacent to the predetermined sector (which may hereinafter be also referred to as an adjacent sector). The "adjacent track" includes a "track adjacent to the predetermined track in the outer direction", a "track adjacent to the predetermined track in the inner direction", and a "plurality of tracks adjacent to the predetermined track in the outer direction and the inner direction". The "adjacent sector" includes a "sector adjacent to the predetermined sector in the outer direction", a "sector adjacent to the predetermined sector in the inner direction", and a "plurality of sectors adjacent to the predetermined sector in the outer direction and the inner direction".

Hereinafter, "writing data in the conventional magnetic recording format" may be referred to as "conventional magnetic recording", "performing a conventional magnetic recording process", or simply "writing".

Meanwhile, when writing a plurality of tracks sequentially, the read/write control unit 610 may execute a write process in the shingled magnetic recording (SMR) or shingled write recording (SWR) format in which a track to be next written is overwritten on a portion of a previously written track in the radial direction. Hereinafter, "writing data in a shingled magnetic recording type" may be referred to as "shingled magnetic recording", "performing a shingled magnetic recording process", or simply "writing".

Figure 3:
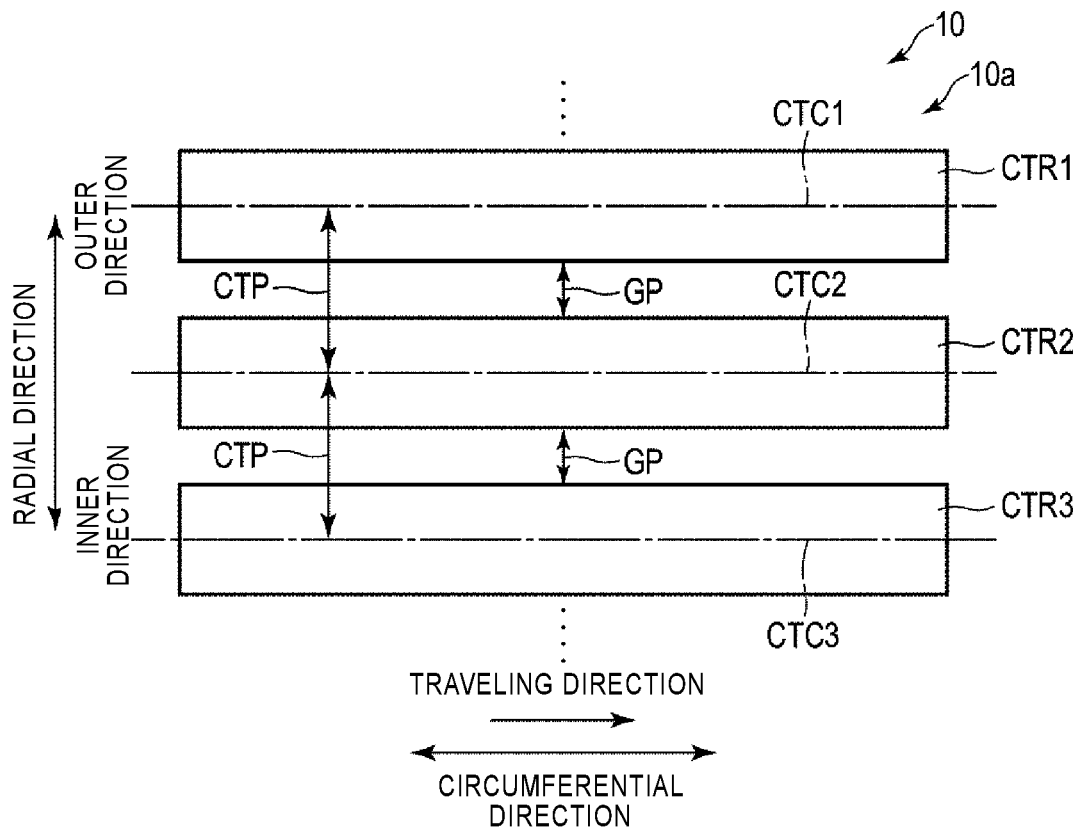
FIG. 3 is a schematic diagram illustrating an example of a normal recording process.

FIG. 3 is a schematic diagram illustrating an example of a conventional magnetic recording process. FIG. 3 illustrates a traveling direction. A direction in which the head 15 sequentially writes and reads data with respect to the disk 10 in the circumferential direction, that is, a direction in which the head 15 travels with respect to the disk 10 in the circumferential direction, may be referred to as a traveling direction. For example, the traveling direction is opposite to the rotation direction of the disk 10. FIG. 3 illustrates tracks CTR1, CTR2, and CTR3. In FIG. 3, for example, the track widths of the tracks CTR1, CTR2, and CTR3 are the same. The track widths of the tracks CTR1 to CTR3 may be different from each other. The terms such as "same", "equal", "match", and "equivalent" include not only the meaning of being exactly the same, but also the meaning of being different enough to be considered substantially the same. FIG. 3 illustrates the track center CTC1 of the track CTR1, the track center CTC2 of the track CTR2, and the track center CTC3 of the track CTR3. In the example illustrated in FIG. 3, the tracks CTR1, CTR2, and CTR3 are written with a track pitch CTP. The track center CTC1 of the track CTR1 and the track center CTC2 of the track CTR2 are separated from each other by the track pitch CTP. The track center CTC2 of the track CTR2 and the track center CTC3 of the track CTR3 are separated from each other by the track pitch CTP. The track CTR1 and the track CTR2 are separated from each other by a gap GP. The track CTR2 and the track CTR3 are separated from each other by the gap GP. The tracks CTR1 to CTR3 may be written at different track pitches. In FIG. 3, for convenience of explanation, each track is illustrated in a rectangular shape extending in the circumferential direction with a predetermined track width. However, each track is actually curved along the circumferential direction. Further, each track may have a wavy shape extending in the circumferential direction while fluctuating in the radial direction.

In the example illustrated in FIG. 3, the MPU 60 positions the head 15 at the track center CTC1 in a predetermined area of the disk 10, for example, the user data area 10a, and normally records in a predetermined sector of the track CTR1 or the track CTR1. The MPU 60 positions the head 15 at the track center CTC2, which is separated by a track pitch CTP from the track center CTC1 of the track CTR1 in the inner direction, in the user data area 10a, and normally records in a predetermined sector of the track CTR2 or the track CTR2. The MPU 60 positions the head 15 at the track center CTC3, which is separated by the track pitch CTP from the track center CTC2 of the track CTR2, in the user data area 10a, and normally records in a predetermined sector of the track CTR3 or the track CTR3. The MPU 60 may normally record in the tracks CTR1, CTR2, and CTR3 sequentially in a predetermined area of the disk 10, for example, the user data area 10a, or may normally record randomly in a predetermined sector of the track CTR1, a predetermined sector of the track CTR2, and a predetermined sector of the track CTR3.

Figure 4:
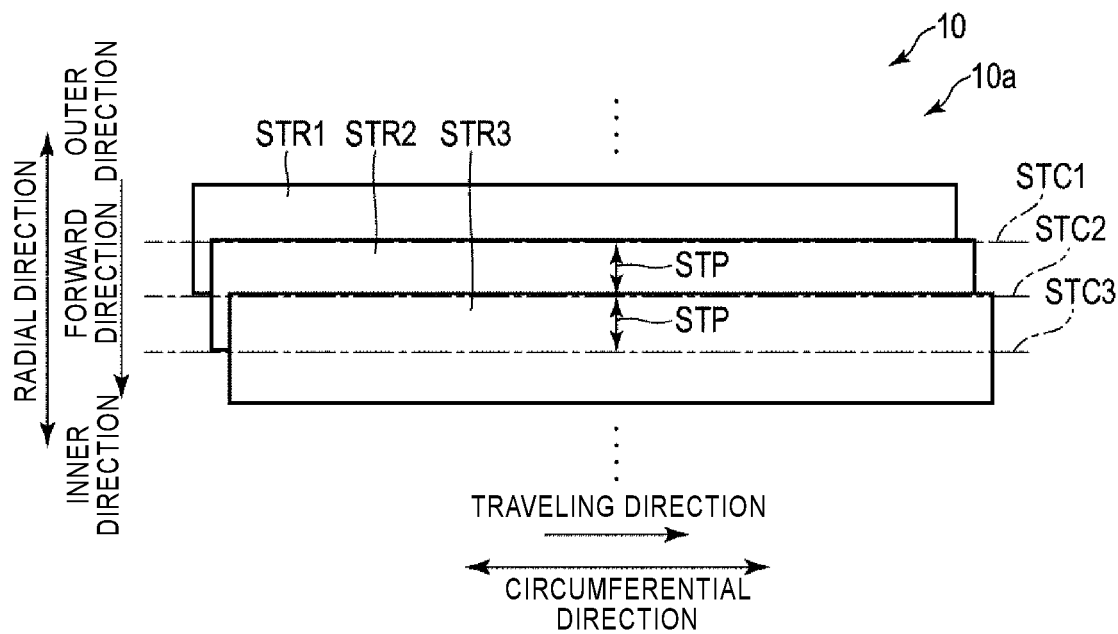
FIG. 4 is a schematic diagram illustrating an example of a shingled magnetic recording process.

FIG. 4 is a schematic diagram illustrating an example of the shingled magnetic recording process. FIG. 4 illustrates a forward direction. A direction in which a plurality of tracks is continuously recorded in a shingled magnetic recording format in the radial direction, that is, a direction in which a track to be next written overlaps with the previously written track in the radial direction, may be referred to as a forward direction. In FIG. 4, the inner direction is the forward direction in the radial direction. Alternatively, the outer direction may be the forward direction in the radial direction. FIG. 4 illustrates a plurality of tracks STR1, STR2, and STR3 that is continuously overwritten in one direction in the radial direction. Hereinafter, in the shingled magnetic recording, a region in which data are written by the write head 15W may be referred to as a write track, and the remaining region other than a region on which other write tracks are overwritten on a predetermined track may be referred to as a read track. FIG. 4 illustrates the track center STC1 of the track STR1 when the other tracks are not overwritten, the track center STC2 of the track STR2 when the other tracks are not overwritten, and the track center STC3 of the track STR3 when the other tracks are not overwritten. In the example illustrated in FIG. 4, the tracks STR1, STR2, and STR3 are written with a track pitch STP. The track center STC1 of the track STR1 and the track center STC2 of the track STR2 are separated from each other by the track pitch STP. The track center STC2 of the track STR2 and the track center STC3 of the track STR3 are separated from each other by the track pitch STP. The tracks STR1 to STR3 may be written with different track pitches. In FIG. 4, the width in the radial direction of the region in which the track STR2 is not overwritten on the track STR1 and the width in the radial direction of the region where the track STR3 is not overwritten on the track STR2 are the same. Meanwhile, the width in the radial direction of the region in which the track STR2 is not overwritten on the track STR1 and the width in the radial direction of the region where the track STR3 is not overwritten on the track STR2 may be different from each other. In FIG. 4, for convenience of explanation, each track is illustrated in a rectangular shape extending in the circumferential direction with a predetermined track width. However, each track is actually curved along the circumferential direction. Further, each track may have a wavy shape extending in the circumferential direction while fluctuating in the radial direction. In FIG. 4, three tracks are overwritten. Fewer or more tracks may be overwritten.

In the example illustrated in FIG. 4, the MPU 60 sequentially records the tracks STR1 to STR3 in the shingled magnetic recording format toward the inner direction at the track pitch STP. The MPU 60 may sequentially record the tracks STR1 to STR3 in the shingled magnetic recording format toward the outer direction at the track pitch STP. The MPU 60 writes the track STR2 with the track pitch STP in the inner direction of the track STR1 and superimposes the track STR2 on a portion of the inner direction of the track STR1. The MPU 60 writes the track STR3 with the track pitch STP in the inner direction of the track STR2 and superimposes the track STR3 on a portion of the inner direction of the track STR2.

The error detection unit 620 detects data, sectors, and regions in which an error has occurred. For example, the error detection unit 620 detects data that cannot be read (which may hereinafter be referred to as read error data or error data) or a sector that cannot be read (which may hereinafter be referred to as a read error sector or an error sector). The error data and the error sector may occur due to, for example, defects, misalignment of the head 15, and misalignment of adjacent tracks.

The error correction unit 630 recovers (corrects, relieves, or error-corrects) the error data or the error sector. The error correction unit 630 executes a read retry that reads the error data or the error sector a plurality of times. Further, the error correction unit 630 executes a process of correcting an error of data or a sector based on an error correction code (which may hereinafter be referred to as an ECC process or an error correction process). The error correction unit 630 executes the ECC process (which may hereinafter be referred to as a sector ECC process) on the error sector based on the ECC corresponding to the error data or the error sector of a predetermined track (which may hereinafter be referred to as a sector ECC). The error correction unit 630 executes the ECC process (which may hereinafter be referred to as a track ECC process) on the error sector based on the ECC corresponding to the error data or the error sector of a predetermined track (which may hereinafter be referred to as a track ECC). For example, based on the parity data or the parity sector corresponding to a predetermined track, the error correction unit 630 performs the track ECC process on the error sector of this track. The error correction unit 630 records, for example, information related to the error sector (which may hereinafter be referred to as error sector information) in a predetermined recording region, for example, the disk 10, the volatile memory 70, or the non-volatile memory 80.

The parity sector management unit 640 calculates the parity sector (or parity data) by performing an exclusive OR (XOR) operation, writes the parity sector (or parity data), and manages the parity sector (or parity data). The parity sector (or parity data) includes, for example, a parity bit and a parity detection code.

The parity sector management unit 640 calculates the parity sector by performing an XOR operation on data of a predetermined region, and writes the calculated parity sector in a predetermined region of the disk 10. The parity sector management unit 640 calculates the parity sector by performing an XOR operation on all sectors of a predetermined track, and writes the calculated parity sector in this track. The parity sector management unit 640 may calculate the parity sector by performing an XOR operation on several sectors of a predetermined track, and may write the calculated parity sector in this track. For example, the parity sector management unit 640 may calculate the parity sector by performing an XOR operation on several sectors of a predetermined track, may calculate the parity sector of the track by performing an XOR operation on the parity sector and a sector to be written in a region excluding the several sectors of the track, and may write the calculated parity sector in this track. For example, the parity sector management unit 640 may calculate the parity sector by performing an XOR operation on all sectors (which may hereinafter be referred to as valid sectors) other than sectors which are invalid (which may hereinafter be referred to as invalid sectors) in a predetermined track, and may write the calculated parity sector in this track. The invalid sectors correspond to sectors not used for recording data. The valid sectors correspond to sectors used for recording data.

The parity sector management unit 640 manages whether each parity sector corresponding to each track is a parity sector that is valid and may be used for error correction (which may hereinafter be referred to as a valid parity sector) or a parity sector that is invalid and cannot be used for error correction (which may hereinafter be referred to as an invalid parity sector).

The parity sector management unit 640 manages the parity sector obtained by performing the XOR operation on all the sectors of the predetermined track, as a valid parity sector. The parity sector management unit 640 records or registers the parity sector of this track, as the valid parity sector, in a predetermined recording region, for example, the disk 10, the volatile memory 70, or the non-volatile memory 80. For example, the parity sector management unit 640 manages the parity sector obtained by performing the XOR operation on all valid sectors of the predetermined track, as the valid parity sector. The parity sector management unit 640 manages the parity sector of this track, as the valid parity sector.

When a parity sector of a track whose several sectors have been written (overwritten or rewritten) is a parity sector before writing the several sectors, the parity sector management unit 640 manages this parity sector as the invalid parity sector. The parity sector management unit 640 records or registers the parity sector of this track, as the invalid parity sector, in a predetermined recording region, for example, the disk 10, the volatile memory 70, or the non-volatile memory 80. For example, the invalid parity sector corresponds to the result of the XOR operation on all the sectors of this track before writing (overwriting or rewriting) several sectors in the track whose several sectors have written (overwritten or rewritten). For example, when a parity sector of the track whose several valid sectors have been written (overwritten or rewritten) is a parity sector before writing the several valid sectors, the parity sector management unit 640 manages this parity sector as the invalid parity sector.

When there is available processing capacity in the magnetic disk device 1, for example, at an idle state, the parity sector management unit 640 calculates (or generates) the parity sector by performing an XOR operation on all sectors including several rewritten sectors in a track including the invalid parity sector (which may hereinafter be referred to as an invalid parity track), and writes (corrects, overwrites, or rewrites) the calculated parity sector (the valid parity sector) in the parity sector of this track. The parity sector management unit 640 records or registers the calculated parity sector, as the valid parity sector, in a predetermined recording region, for example, the disk 10, the volatile memory 70, or the non-volatile memory 80.

For example, when receiving a write command to write all sectors corresponding to a predetermined track in the disk 10 from the host 100, the parity sector management unit 640 writes all the sectors of this track at a predetermined position, calculates (or generates) the parity sector by performing an XOR operation on all sectors (e.g., valid sectors) of this one track, and writes the calculated parity sector in the parity sector of this track. The parity sector management unit 640 records or registers the parity sector of this track, as the valid parity sector, in a predetermined recording region, for example, the disk 10, the volatile memory 70, or the non-volatile memory 80, as a table. Hereinafter, a "track including the valid parity sector" may be referred to as a "valid parity track".

For example, when receiving a write command to write some sectors of a predetermined track in the disk 10 from the host 100, the parity sector management unit 640 first reads the predetermined track and calculates the parity sector for all sectors excluding the written sector of the predetermined track by performing an XOR operation on all sectors excluding a sector in a region written by the write command and the parity sector. Next, the parity sector management unit 640 writes the sector to be written in this track by the write command, and the parity sector of this track, which is the result of the XOR operation on the parity sector and the sector to be written. The parity sector management unit 640 records or registers the parity sector of this track, as the valid parity sector, in a predetermined recording region, for example, the disk 10, the volatile memory 70, or the non-volatile memory 80, as a table. Hereinafter, "generating the parity sector from all sectors excluding several sectors of a predetermined track and updating the parity sector of this track by performing an XOR operation on a sector to be written in a portion of the region and the other parity sectors" may be referred to as "read-modify-write".

For example, when receiving a write command to write several sectors of a predetermined track in the disk 10 from the host 100, the parity sector management unit 640 writes (overwrites or rewrites) the several sectors of this track and does not calculate the parity sector without an XOR operation on this track. The parity sector management unit 640 records or registers the parity sector of this track, as the invalid parity sector, in a predetermined recording region, for example, the disk 10, the volatile memory 70, or the non-volatile memory 80, as a table. Hereinafter, a "track including the invalid parity sector" may be referred to as an "invalid parity track". The parity sector management unit 640 reads the invalid parity track at an idle state, generates the valid parity sector by performing an XOR operation on all the sectors of the invalid parity track, writes (corrects, overwrites, or rewrites) the valid parity sector in the invalid parity sector, and changes from the invalid parity track to the valid parity track.

The monitor target sector management unit 650 manages an error sector in which an error occurs due to a defect, for example, a scratch on the disk 10 (which may hereinafter be referred to as a monitor target sector). The monitor target sector management unit 650 detects the monitor target sector when reading a predetermined track. When detecting the monitor target sector, the monitor target sector management unit 650 records information such as the position and sector number of the disk 10 of the monitor target sector (which may hereinafter be referred to as monitor target sector information) and information such as a bit string indicating defects corresponding to the monitor target sector, for example, the scratch position and the scratch length (which may hereinafter be referred to as defect information), in a predetermined recording region, for example, the disk 10, the volatile memory 70, or the non-volatile memory 80.

For example, when detecting an error sector in a predetermined track and then reading this track again, and when detecting a read error again in this error sector, the monitor target sector management unit 650 sets, records, or registers the error sector in which the read error is detected again as the monitor target sector, in a table. The monitor target sector management unit 650 sets, records, or registers, for example, the sector number corresponding to the monitor target sector and the defect information corresponding to the monitor target sector, as a table in a predetermined recording region, for example, the disk 10, the volatile memory 70, or the non-volatile memory 80. The monitor target sector management unit 650 sets, records, or registers, for example, erasure information indicating that the data quality of the monitor target sector is low or the possibility of error is high as compared with other regions, as a table in a predetermined recording region, for example, the disk 10, the volatile memory 70, or the non-volatile memory 80. The erasure information corresponds to information indicating defects, for example, the position and length of a scratch. For example, by setting the erasure information in the monitor target sector, quality improvement of the entire track may be performed (used to determine whether to re-assign) more accurately on the R/W channel 40 and the correction may be performed efficiently.

Figure 5:
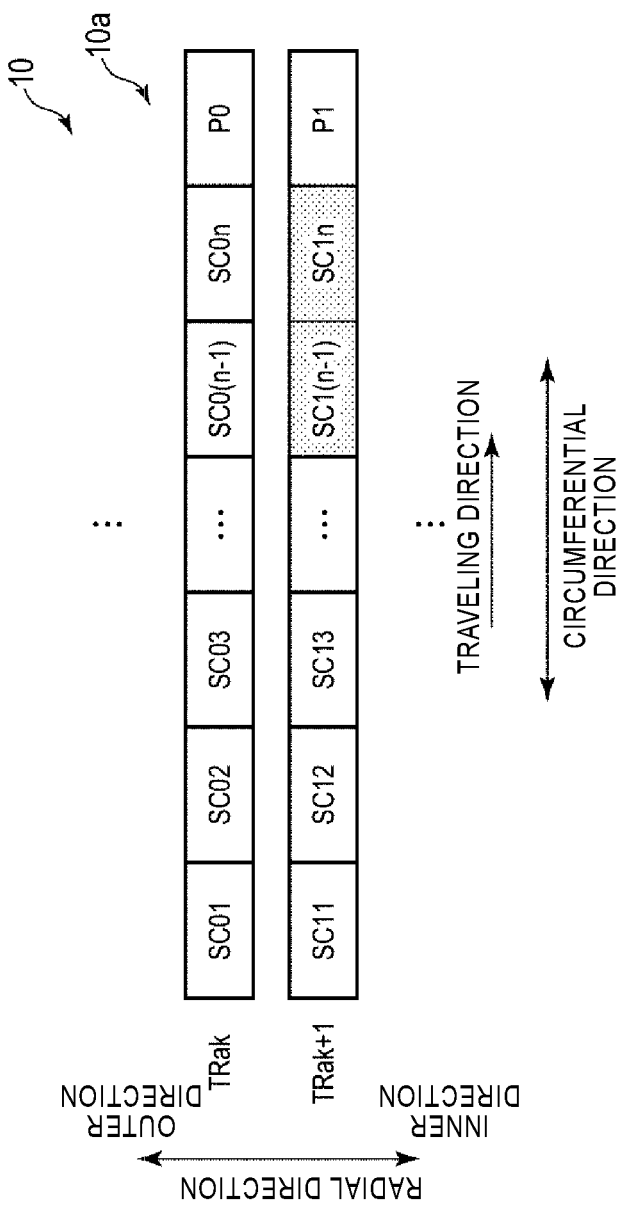
FIG. 5 is a schematic diagram illustrating an example of a monitor target sector and a parity sector according to the embodiment.

FIG. 5 is a schematic diagram illustrating an example of a monitor target sector and a parity sector according to the present embodiment. FIG. 5 illustrates tracks TRak and TRak+1. In FIG. 5, the tracks TRak and TRak+1 are continuously arranged in the inner direction in the user data area 10a in the order of description. The track TRak has sectors SC01, SC02, SC03, . . . , SC0(n−1), SC0n and a parity sector P0. The sectors SC01 to SC0(n−1) are continuously arranged in the traveling direction in the order of description. The parity sector P0 is adjacent to the traveling direction of the sector SC0(n−1). The parity sector P0 corresponds to the result of an XOR operation on the sectors SC01 to SC0n. The track TRak+1 has sectors SC11, SC12, SC13, . . . , SC1(n−1), and SC1n and a parity sector P1. The sectors SC11 to SC1(n−1) are continuously arranged in the traveling direction in the order of description. The parity sector P1 is adjacent to the traveling direction of the sector SC1(n−1). The parity sector P1 corresponds to the result of an XOR operation on the sectors SC11 to SC1n.

In the example illustrated in FIG. 5, when receiving a command to write the track TRak from the host 100, the MPU 60 writes all the sectors SC01 to SC0n of the track TRak in the traveling direction in the order of description. The MPU 60 performs an XOR operation on the sectors SC01 to SC0n and writes the result of the XOR operation on the sectors SC01 to SC0n in the parity sector (the valid parity sector) P0. For example, the MPU 60 may execute the track ECC on the track TRak based on the parity sector P0.

When receiving a command to write the track TRak+1 from the host 100, the MPU 60 writes all the sectors SC11 to SC1n of the track TRak+1 in the traveling direction in the order of description. The MPU 60 performs an XOR operation on the sectors SC11 to SC1n and writes the result of the XOR operation on the sectors SC11 to SC1n in the parity sector (the valid parity sector) P1. When receiving a command to overwrite data on several sectors of the track TRak+1 from the host 100, the MPU 60 first calculates the parity sector by performing an XOR operation on all sectors excluding the overwritten sectors and the parity sector P1 of the track TRak+1. The MPU 60 may overwrite data on several sectors of the track TRak+1 and write the result of an XOR operation on the parity sector and the overwritten data in the parity sector (the valid parity sector) P1. For example, the MPU 60 may execute the track ECC on the track TRak+1 based on the parity sector P1.

Figure 6:
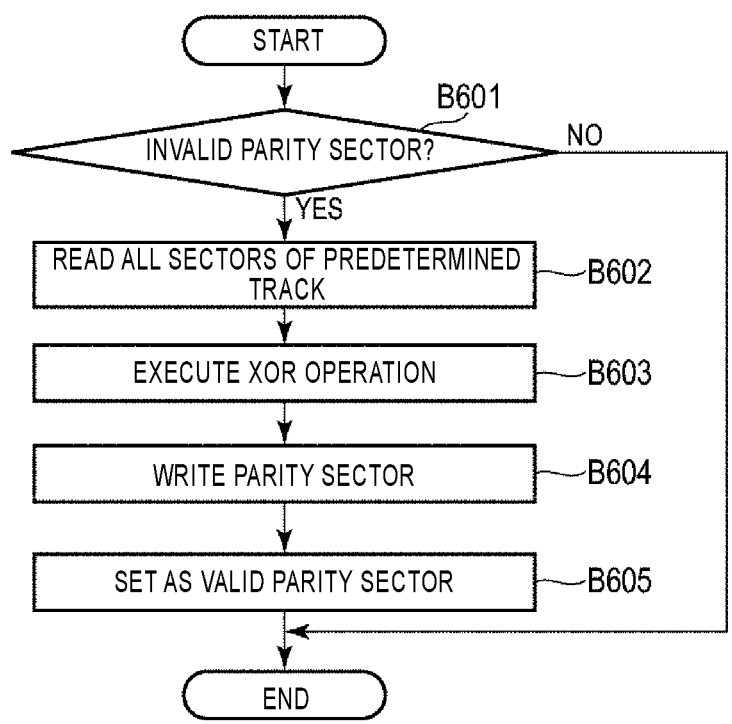
FIG. 6 is a flowchart illustrating an example of a method of updating the parity sector.

FIG. 6 is a flowchart illustrating an example of a method of updating a parity sector. The MPU 60 determines whether the parity sector of a predetermined track is an invalid parity sector (B601). In other words, the MPU 60 determines whether the parity sector of a predetermined track is an invalid parity sector or a valid parity sector. When it is determined that the parity sector of the predetermined track is the valid parity sector ("NO" in B601), the MPU 60 ends the process. When it is determined that the parity sector of the predetermined track is the invalid parity sector ("YES" in B601), the MPU 60 reads all the sectors (one track) of the predetermined track (B602) and executes an XOR operation on all the sectors of this track (B603). The MPU 60 writes (overwrites or rewrites) the result of the XOR operation on all the sectors of the predetermined track in the parity sector of this track (B604), sets or registers the invalid parity sector of the predetermined track, as the valid parity sector (B605), and then ends the process.

Figure 7:
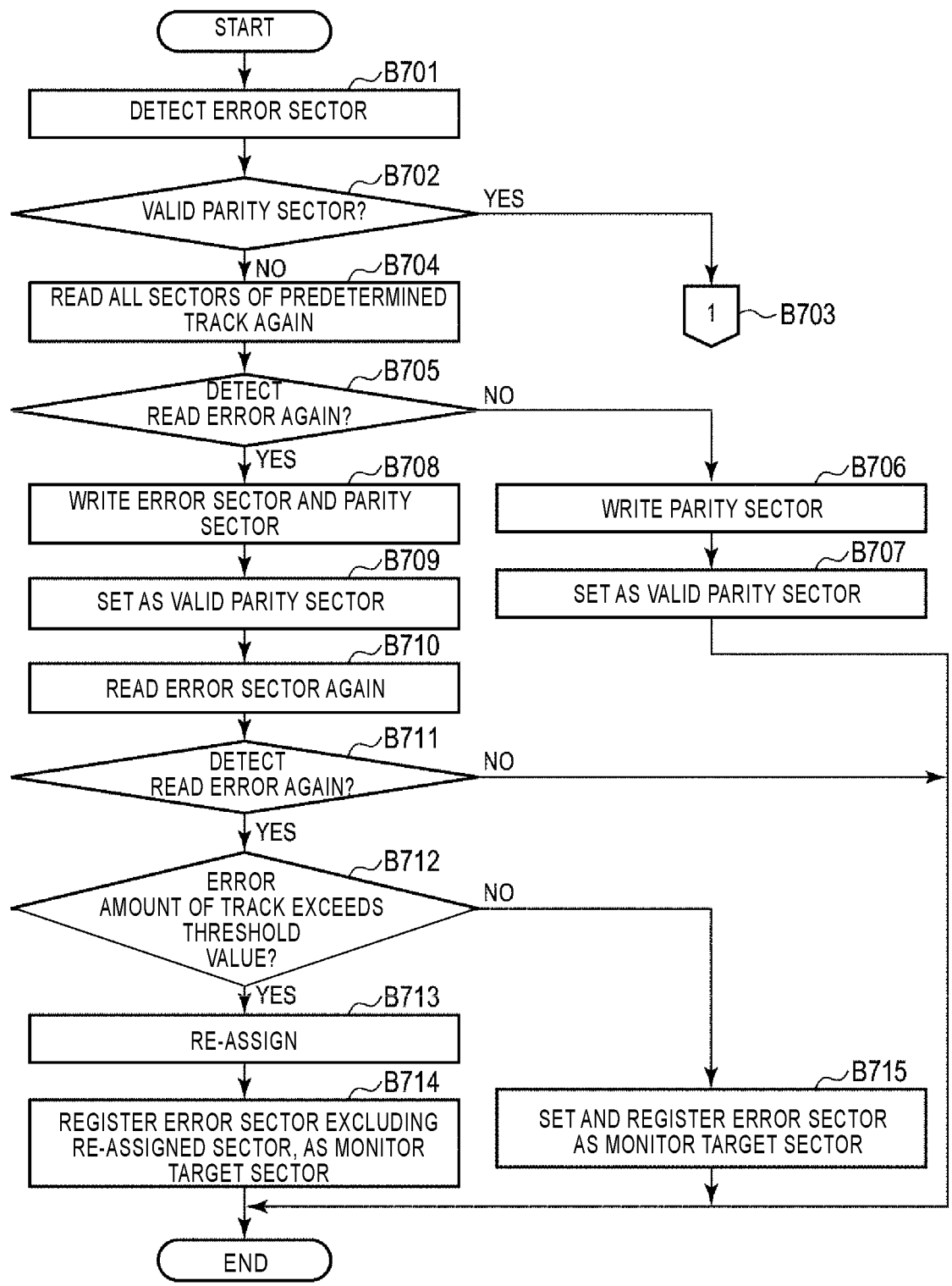
FIG. 7 is a flowchart illustrating an example of a method of setting a monitor target sector in a track including an invalid parity sector according to the embodiment.

FIG. 7 is a flowchart illustrating an example of a method of setting a monitor target sector in a track including an invalid parity sector according to the present embodiment. The MPU 60 detects an error sector on a predetermined track (B701) and determines whether a parity sector corresponding to this track is a valid parity sector (B702). In other words, the MPU 60 determines whether the parity sector corresponding to a predetermined track is a valid parity sector or an invalid parity sector. When it is determined that the parity sector corresponding to the predetermined track is the valid parity sector ("YES" in B702), the MPU 60 proceeds to a flowchart of FIG. 9 to be described later (B703). When it is determined that the parity sector corresponding to the predetermined track is the invalid parity sector ("NO" in B702), the MPU 60 reads all the sectors (one track) of the predetermined track of the disk 10 again (B704) and determines whether a read error has been detected again in the error sector of this track (B705).

When it is determined that the read error has not been detected again in the error sector of the predetermined track ("NO" in B705), the MPU 60 writes (overwrites or rewrites) the result of the XOR operation on all the sectors of this track, as the parity sector (B706). The MPU 60 sets or registers the parity sector corresponding to the predetermined track, as the valid parity sector (B707) and ends the process.

When it is determined that the read error has been detected again in the error sector of the predetermined track ("YES" in B705), the MPU 60 continues to retry until it can read correctly, overwrites the error sector with the obtained correct data, and writes (overwrites or rewrites) the result of an XOR operation on all the sectors including this error sector of the corresponding track, in the parity sector (B708). The MPU 60 sets or registers the parity sector corresponding to the predetermined track, as the valid parity sector (B709), reads the error sector of this track again (B710).

The MPU 60 determines whether a read error has been detected again in the error sector of a predetermined track (B711). When it is determined that the read error has not been detected again in the error sector of the predetermined track ("NO" in B711), the MPU 60 ends the process.

When it is determined that the read error has been detected again in the error sector of the predetermined track ("YES" in B711), the MPU 60 determines whether the error amount of the track exceeds a threshold value (B712). When it is determined that the error amount does not exceed the threshold value ("NO" in B712), the MPU 60 sets and registers the error sector as the monitor target sector (B715). When it is determined that the error amount exceeds the threshold value ("YES9" in B712), the MPU 60 re-assigns the error sector (B713), registers the error sector as the monitor target sector (B714), and then ends the process.

Figure 8:
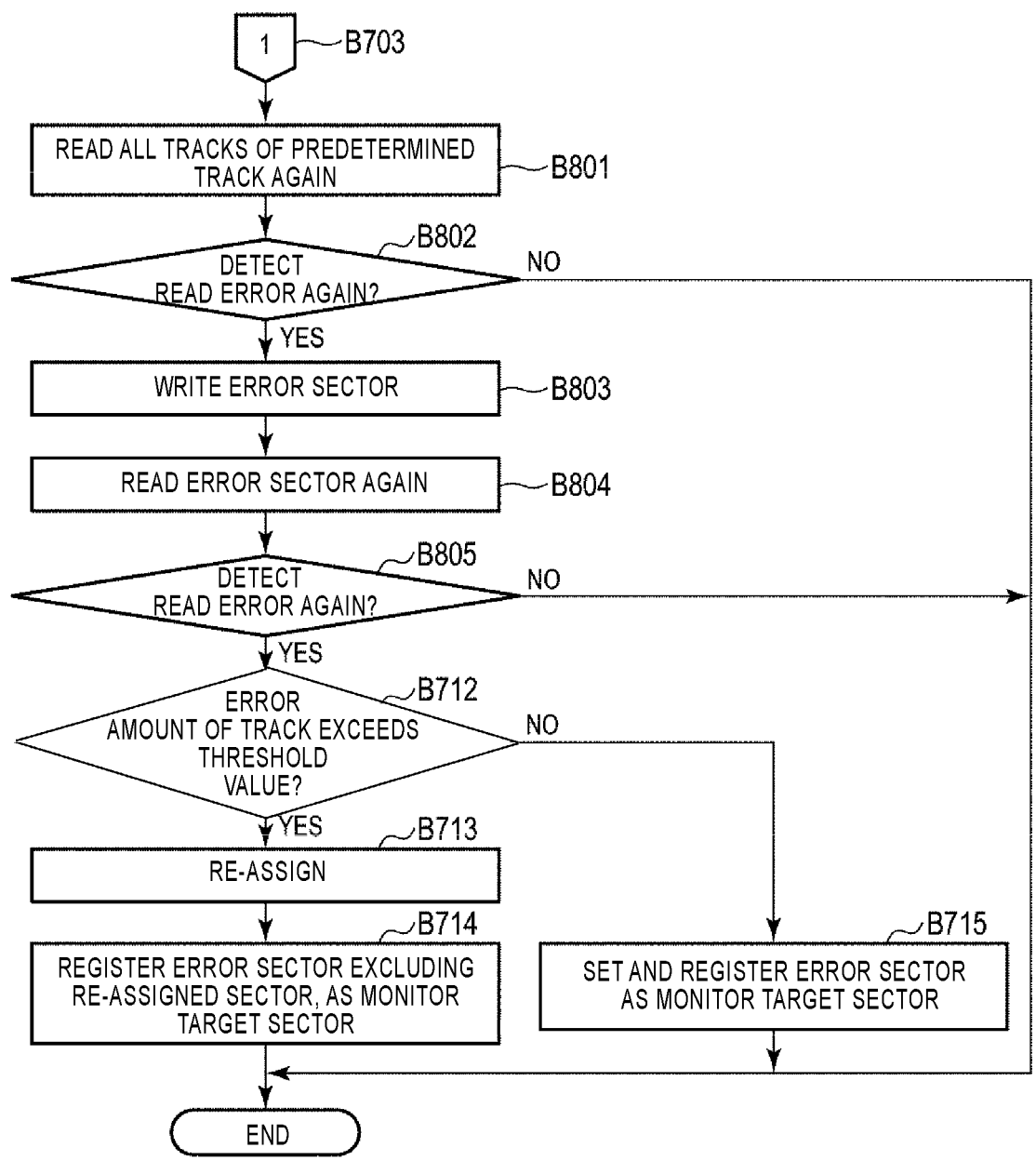
FIG. 8 is a flowchart illustrating an example of a method of setting a monitor target sector in a track including a valid parity sector according to the embodiment.

FIG. 8 is a flowchart illustrating an example of a method of setting a monitor target sector in a track including a valid parity sector according to the present embodiment. When the process proceeds to B703 in the flowchart illustrated in FIG. 7, the MPU 60 reads all the sectors of a predetermined track of the disk 10 again (B801) and determines whether a read error has been detected again in the error sector of this track (B802). When it is determined that the read error has not been detected again in the error sector of this track ("NO" in B802), the MPU 60 ends the process. When it is determined that the read error has been detected again in the error sector of this track ("YES" in B802), the MPU 60 continues to retry until it can read correctly, overwrites the error sector with the obtained correct data (B803), and then reads this error sector again (B804).

The MPU 60 determines whether a read error has been detected again in the error sector of a predetermined track (B805). When it is determined that the read error has not been detected again in the error sector of this track ("NO" in B805), the MPU 60 ends the process. When it is determined that the read error has been detected again in the error sector of the predetermined track ("YES" in B805), the MPU 60 determines whether the error amount of the track exceeds a threshold value (B712). When it is determined that the error amount of the track does not exceed the threshold value ("NO" in B712), the MPU 60 proceeds to the process of B715. When it is determined that the error amount of the track exceeds the threshold value ("YES9" in B712), the MPU 60 re-assigns the error sector (B713), registers the error sector as the monitor target sector (B714), and then ends the process.

Figure 9:
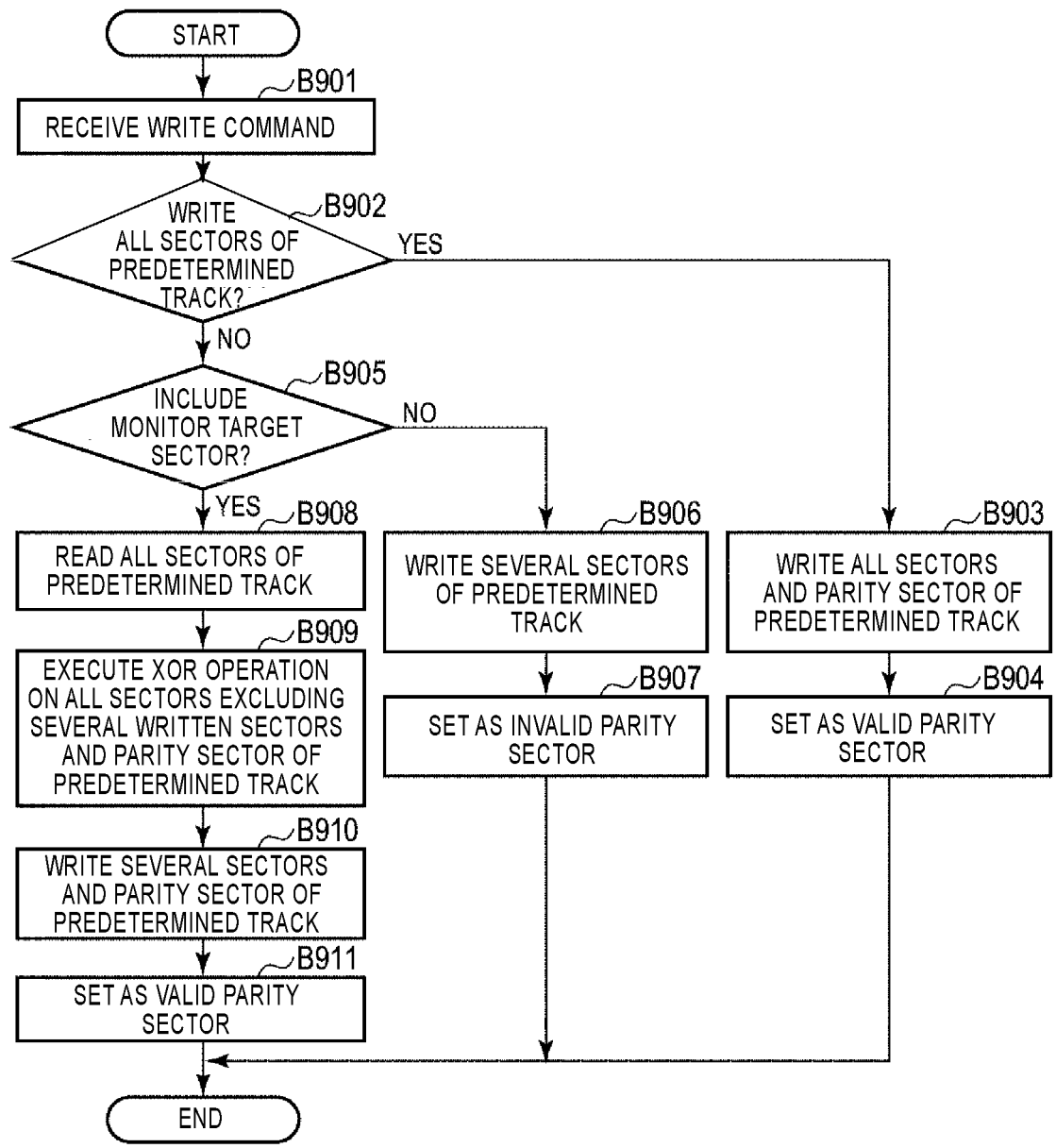
FIG. 9 is a flowchart illustrating an example of a write processing method according to the embodiment.

FIG. 9 is a flowchart illustrating an example of a write processing method according to the present embodiment. The MPU 60 receives a write command from the host 100 (B901). The MPU 60 determines whether to write all the sectors of a predetermined track in the disk 10 (B902). In other words, the MPU 60 determines whether to write all the sectors of a predetermined track of the disk 10 or to write (overwrite or rewrite) a portion of the predetermined track, for example, several sectors of the predetermined track.

When it is determined that all the sectors of the predetermined track of the disk 10 is to be written ("YES" in B902), the MPU 60 writes all the sectors of the predetermined track and writes (overwrites or rewrites) the result of an XOR operation on all the sectors of this track, as the parity sector of this track (B903). The MPU 60 sets or registers the parity sector corresponding to the predetermined track, as the valid parity sector (B904) and then ends the process.

When it is determined that several sectors of the predetermined track of the disk 10 are to be written ("NO" in B902), the MPU 60 determines whether this track includes a monitor target sector (B905). When it is determined that the predetermined track does not include the monitor target sector (NO in B905), the MPU 60 writes the several sectors of the predetermined track (B906). The MPU 60 sets or registers the parity sector corresponding to the predetermined track, as the invalid parity sector (B907) and then ends the process.

When it is determined that the predetermined track includes the monitor target sector ("YES" in B905), the MPU 60 reads all the sectors (one track) of the track including the monitor target sector in the disk 10 (B908) and executes an XOR operation on all sectors excluding the written sectors and the parity sector of the predetermined track (B909). The MPU 60 writes all the sectors including the several written sectors of the predetermined track and writes (overwrites or rewrites) the result of an XOR operation on the result of the XOR operation generated in B909 and the several written sectors, as the parity sector of this track (B910). The MPU 60 sets or registers the parity sector corresponding to the predetermined track, as the valid parity sector (B911) and then ends the process. The processes of B908 to B912 corresponds to, for example, the read-modify-write.

According to the embodiment, in the magnetic disk device 1, the parity sector of a track containing a defect, for example, a scratch, after partial writing of the track, is a valid parity sector. The magnetic disk device 1 may correct or recover an error sector caused by a defect, for example, a scratch. Therefore, the magnetic disk device 1 does not have to have a region for re-assigning in the disk 10. The magnetic disk device 1, after partial writing of a track, executes read-modify-write on only a track containing a defect, for example, a scratch. Therefore, the magnetic disk device 1 may improve the processing performance.

Next, magnetic disk devices according to embodiments and modifications other than the above-described embodiment will be described. In other embodiments and other modifications, the same portions and parts as those in the above-described embodiment are denoted by the same reference numerals, and detailed explanation thereof will not be repeated.

(First Modification)

Figure 10:
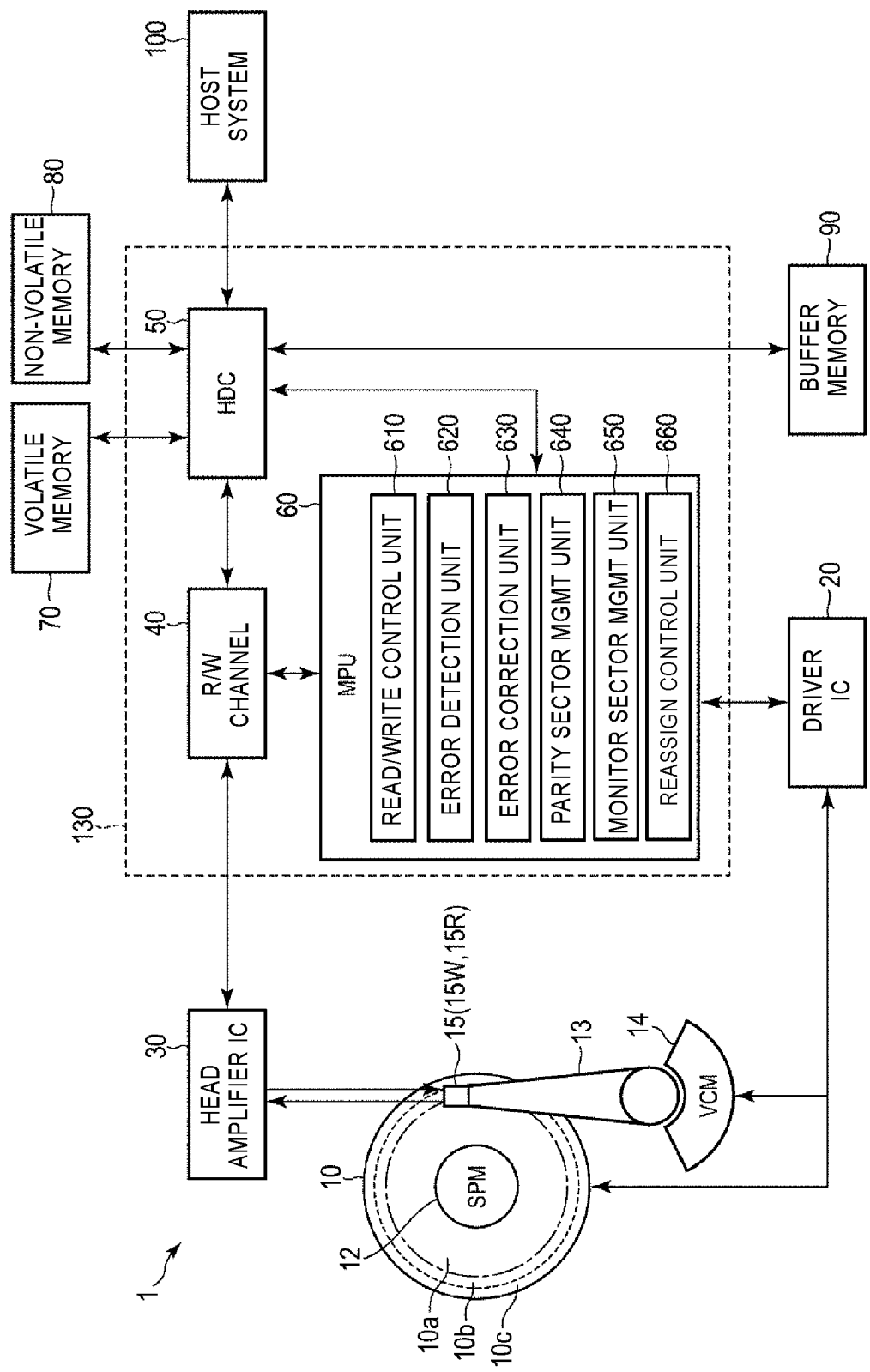
FIG. 10 is a block diagram illustrating the configuration of a magnetic disk device according to a first modification.

A magnetic disk device 1 of a first modification is different from the magnetic disk device 1 of the above-described embodiment in that a re-assigning process is executed. FIG. 10 is a block diagram illustrating the configuration of the magnetic disk device 1 according to the first modification.

The MPU 60 further has a re-assign control unit 660. The MPU 60 executes a process of the re-assign control unit 660 on firmware. The MPU 60 may have the re-assign control unit 660 as a circuit. The re-assign control unit 660 may be provided in the R/W channel 40 or the HDC 50.

The re-assign control unit 660 re-assigns (or performs a re-assigning process on) a predetermined region, for example, a sector or data. The re-assign or re-assigning process includes a process of writing data, which are written in a predetermined region, in a region other than the predetermined region, that is, a process of replacing, re-arranging, or copying (replicating) a predetermined sector with another sector different from the predetermined sector. The re-assign control unit 660 re-assigns an error sector. For example, when the number of error sectors or the length of a defect, for example, a scratch, in a predetermined track exceeds a threshold value, the re-assign control unit 660 re-assigns at least one corresponding error sector, for example, a monitor target sector, to a predetermined region of the disk 10, for example, the media cache 10b or the system area 10c based on the monitor target sector information and the defect information. Here, the threshold value corresponds to the number of sectors that may be corrected or recovered by the track ECC. For example, the re-assign control unit 660 records or registers the re-assigned error sector, for example, the monitor target sector, as the invalid sector, in a predetermined recording region, for example, the disk 10, the volatile memory 70, or the non-volatile memory 80.

Figure 11:
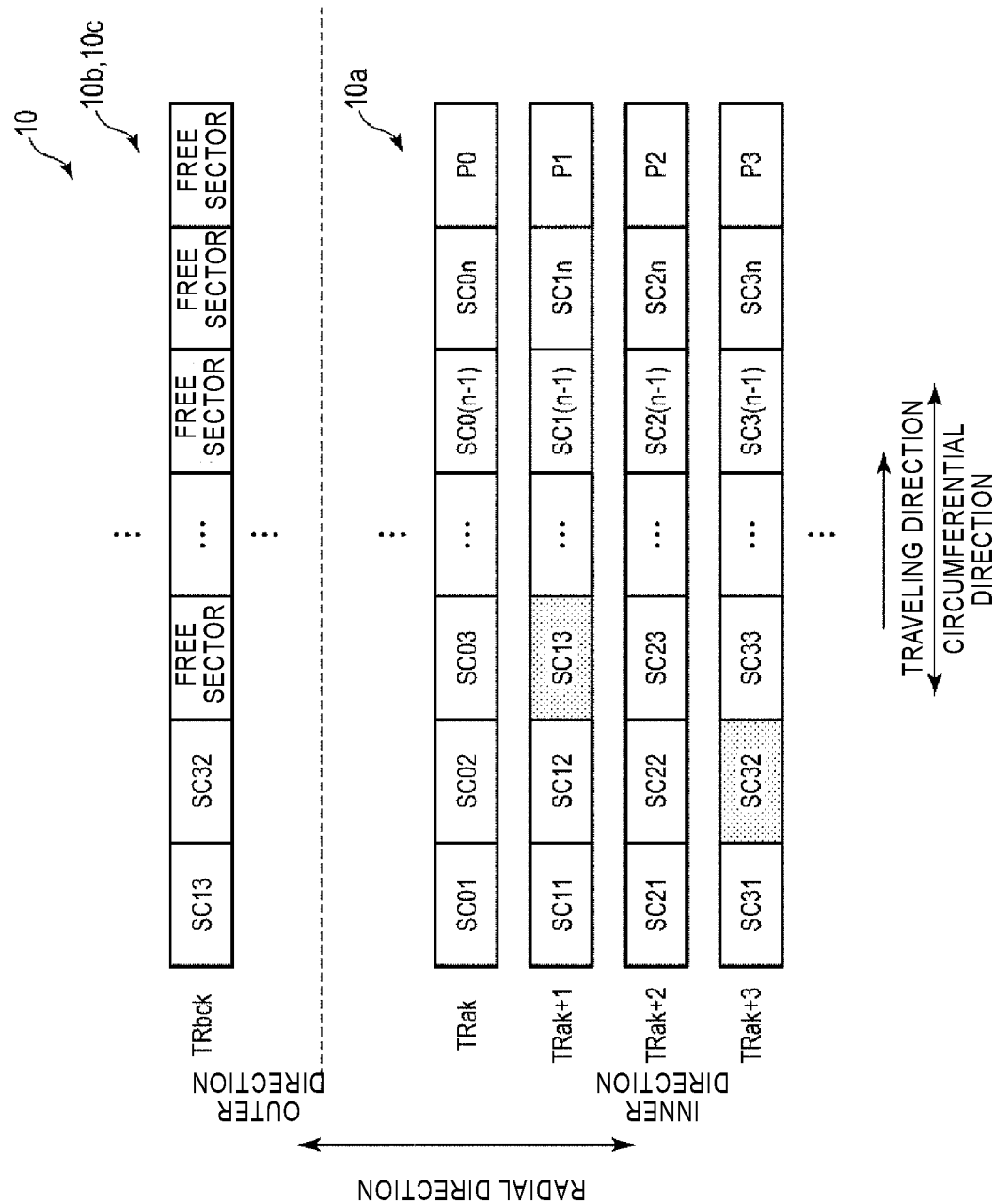
FIG. 11 is a schematic diagram illustrating an example of a re-assign processing method according to the first modification.

FIG. 11 is a schematic view illustrating an example of a re-assign processing method according to the first modification. FIG. 11 illustrates tracks TRbck, TRak, TRak+1, TRak+2, and TRak+3. In FIG. 11, the tracks TRak, TRak+1, TRak+2, and TRak+3 are continuously arranged in the inner direction in the user data area 10a in the order of description. The tracks TRak and TRak+1 correspond to the tracks TRak to TRak+3 illustrated in FIG. 5. The track TRak+2 has sectors SC21, SC22, SC23, . . . , SC2($n$–1), and SC2$n$ and a parity sector P2. The sectors SC21 to SC2($n$–1) are continuously arranged in the traveling direction in the order of description. The parity sector P2 is adjacent to the traveling direction of the sector SC2($n$–1). The parity sector P2 corresponds to the result of an XOR operation on the sectors SC21 to SC2$n$. The track TRak+3 has sectors SC31, SC32, SC33, . . . , SC3($n$–1), and SC3$n$ and a parity sector P3. The sectors SC31 to SC3($n$–1) are continuously arranged in the traveling direction in the order of description. The parity sector P3 is adjacent to the traveling direction of the sector SC3($n$–1). The parity sector P3 corresponds to the result of an XOR operation on the sectors SC31 to SC3$n$. The track TRbck is disposed in the media cache 10b and/or the system area 10c. The track TRbck corresponds to a recording region in which a re-assigned sector (or data) is written. The track TRbck has sectors SC13 and SC32, and a plurality of free sectors. In the track TRbck, the sector SC32 is adjacent to the traveling direction of the sector SC13. The sector SC13 of the track TRbck corresponds to the sector SC13 of the track TRak+1. The sector SC32 of the track TRbck corresponds to the sector SC32 of the track TRak+3.

In the example illustrated in FIG. 11, the MPU 60 reads the track TRak+1 and detects a plurality of monitor target sectors. When the number of monitor target sectors is larger than a threshold value by one, the MPU 60 re-assigns the monitor target sector SC13 to the track TRbck and sets the monitor target sector SC13 of the track TRak+1 as an invalid sector. The MPU 60 reads all the sectors SC11, SC12, . . . , SC1($n$–1), and SC1$n$ other than the sector SC13 of the track TRak+1 and writes the result of an XOR operation on all the sectors other than the sector SC13 in the parity sector P1. Even when detecting a plurality of monitor target sectors, the MPU 60 does not execute re-assign when the individual erasure information (error length) is small. Further, even when the number of monitor target sectors is 1, the MPU 60 may execute re-assign when the erasure information is large.

In the example illustrated in FIG. 11, the MPU 60 reads the track TRak+3 and detects a plurality of monitor target sectors. When the number of monitor target sectors is larger than a threshold value by one, the MPU 60 re-assigns the monitor target sector SC32 to the track TRbck and sets the monitor target sector SC32 of the track TRak+3 as an invalid sector. The MPU 60 reads all the sectors SC31, SC33, . . . , SC3($n$–1), and SC3$n$ other than the sector SC32 of the track TRak+3 and writes the result of an XOR operation on all the sectors other than the sector SC32 in the parity sector P3.

Figure 12:
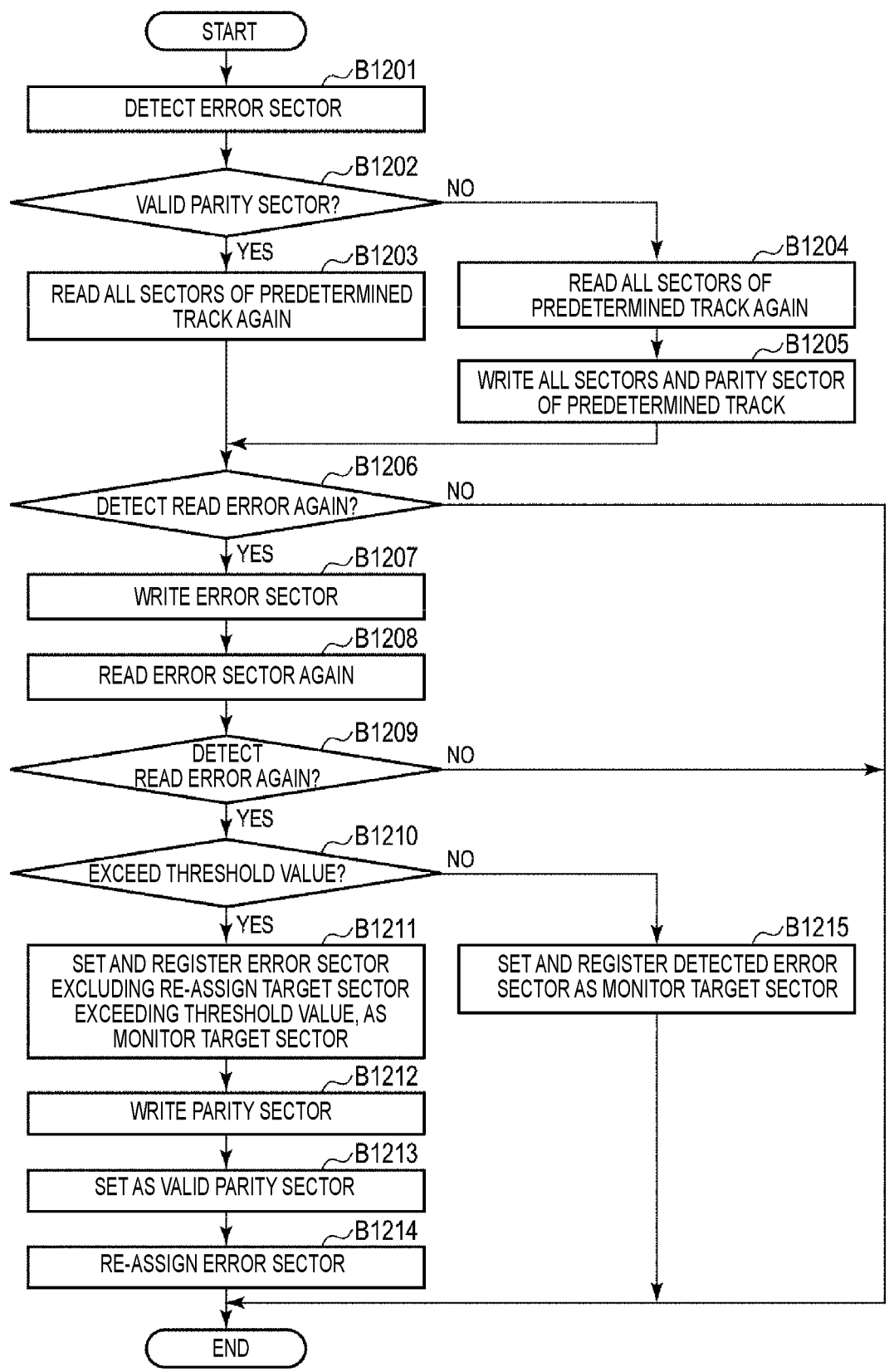
FIG. 12 is a flowchart illustrating an example of a re-assign processing method according to the first modification.

FIG. 12 is a flowchart illustrating an example of a re-assigning method according to the first modification. The MPU 60 detects an error sector in a predetermined track (B1201) and determines whether the parity sector corresponding to this track is a valid parity sector (B1202). In other words, the MPU 60 determines whether the parity sector corresponding to the predetermined track is a valid parity sector or an invalid parity sector. When it is determined that the parity sector corresponding to the predetermined track is the valid parity sector ("YES" in B1202), the MPU 60 reads all the sectors (one track) of the predetermined track of the disk 10 again (B1203) and proceeds to the process of B1206. When it is determined that the parity sector corresponding to the predetermined track is the invalid parity sector ("NO" in B1202), the MPU 60 reads all the sectors (one track) of the predetermined track of the disk 10 again (B1204). The MPU 60 writes all the sectors of the predetermined track of the disk 10 and writes (overwrites or rewrites) the result of an XOR operation on all the sectors of the track, as the parity sector (B1205).

The MPU 60 determines whether a read error has been detected again in the error sector of a predetermined track (B1206). When it is determined that the read error has not been detected again in the error sector of the predetermined track ("NO" in B1206), the MPU 60 ends the process. When it is determined that the read error has been detected again in the error sector of the predetermined track ("YES" in B1206), the MPU 60 continues to retry until it can read correctly, writes the error sector in which the read error is detected again in the predetermined track, with the correct data (B1207), and reads the written error sector again in this track (B1208).

The MPU 60 determines whether a read error has been detected again in the error sector of a predetermined track (B1209). When it is determined that the read error has not been detected again in the error sector of the predetermined track ("NO" in B1209), the MPU 60 ends the process. When it is determined that the read error has been detected again in the error sector of the predetermined track ("YES" in B1209), the MPU 60 sets or registers this error sector as the monitor target sector and determines whether the number or length of error sectors in this track exceeds a threshold value (B1210). When it is determined that the number or length of error sectors in the predetermined track does not exceed the threshold value ("NO" in B1210), the MPU 60 sets and registers the detected error sector as the monitor target sector (B1215) and then ends the process.

When it is determined that the number or length of error sectors exceeds the threshold value in the predetermined track ("YES" in B1210), the MPU 60 sets and registers the error sector exceeding the threshold value, as the monitor target sector (B1211). The MPU 60 reads all the sectors other than at least one error sector that is re-assigned, and writes (overwrites or rewrites) the result of an XOR operation on all the sectors other than the at least one re-assigned error sector, as the parity sector (B1212). The MPU 60 sets or registers the parity sector written in the predetermined track, as the valid parity sector (B1213), seeks to another track different from the predetermined track to re-assign the at least one error sector to the another track, sets the at least one re-assigned error sector in the track before re-assigning, as the invalid sector (B1214), and then ends the process.

According to the first modification, when it is determined that the number or length of error sectors exceeds the threshold value in a predetermined track, the magnetic disk device 1 re-assigns at least one error sector selected to be equal to or less than the threshold value, to the media cache 10b or the system area 10c. The magnetic disk device 1 may reduce the possibility that an error such as a read error occurs even when a number of error sectors that cannot be corrected or recovered by the track ECC occur. Therefore, the reliability of the magnetic disk device 1 may be improved.

(Second Modification)

A magnetic disk device 1 of a second modification is different from the magnetic disk devices 1 of the above-described embodiment and first modification in a timing of read-modify-write. When receiving a write command to write data in a track including a monitor target sector, the MPU 60 determines whether the media cache 10b has a free space. When it is determined that the media cache 10b has the free space, the MPU 60 temporarily stores the write command (or write data) in the media cache 10b of the disk 10. When there is available processing capacity, for example, at an idle state, the MPU 60 executes read-modify-write.

Figure 13:
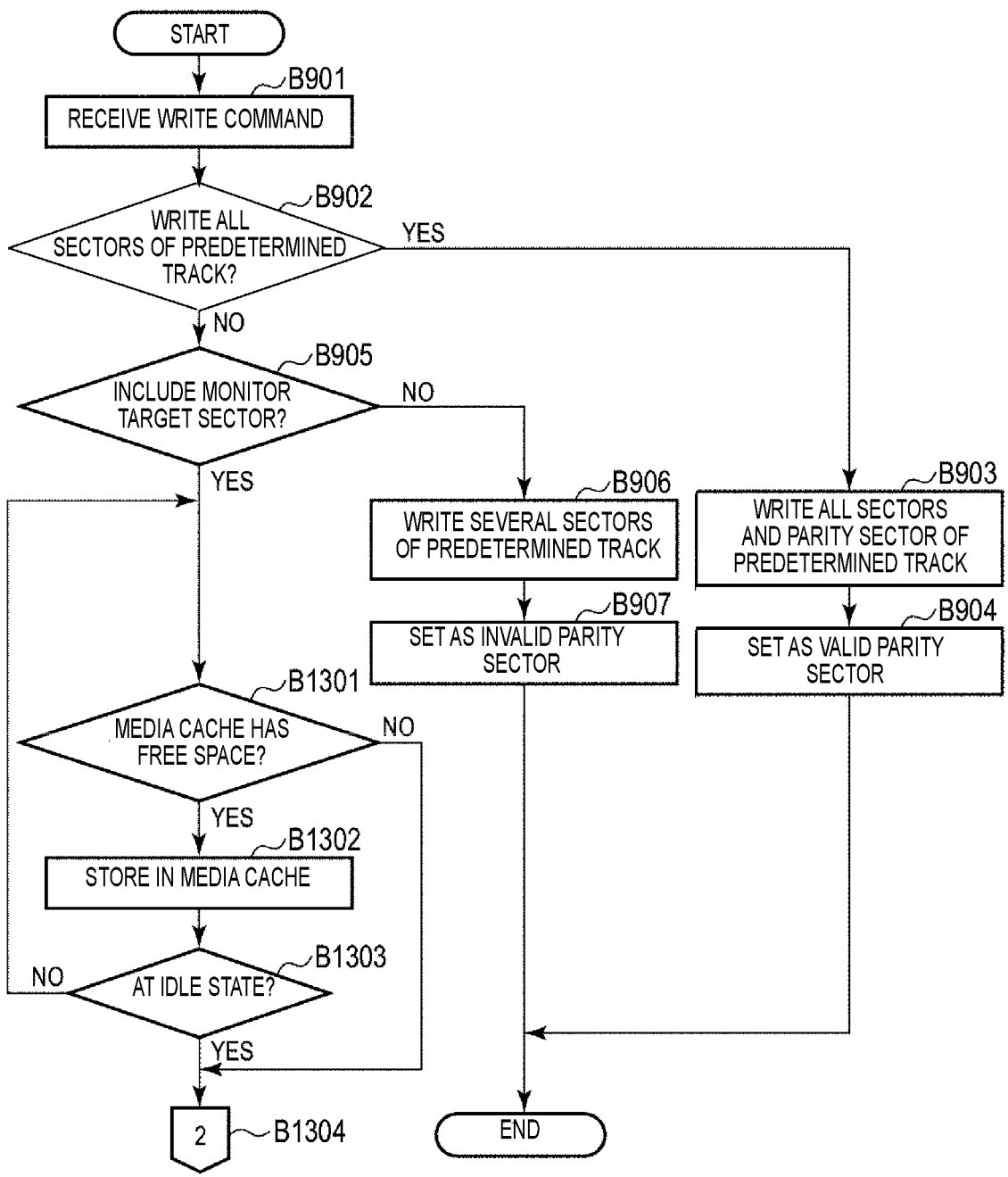
FIG. 13 is a flowchart illustrating an example of a write processing method according to a second modification.

FIG. 13 is a flowchart illustrating an example of a write processing method according to the second modification. The MPU 60 receives a write command from the host 100 (B901). The MPU 60 determines whether to write all sectors (one track) of a predetermined track in the disk 10 (B902). When it is determined that several sectors of the predetermined track of the disk 10 is to be written ("NO" in B902), the MPU 60 determines whether this track includes a monitor target sector (B905).

When it is determined that the predetermined track includes the monitor target sector ("YES" in B905), the MPU 60 determines whether the media cache 10b has a free space (B1301). When it is determined that the media cache 10b has no free space ("NO" in B1301), the MPU 60 proceeds to a flowchart of FIG. 14 to be described later (B1304).

When it is determined that the media cache 10b has the free space ("YES" in B1301), the MPU 60 temporarily stores the write command (or write data) in the media cache 10b (B1302). The MPU 60 determines whether there is available processing capacity (B1303). In other words, the MPU 60 determines whether it is at an idle state. When it is determined that it is not at an idle state ("NO" in B1303), the MPU 60 proceeds to the process of B908. When it is determined that it is at an idle state ("YES" in B1303), the MPU 60 proceeds to the flowchart of FIG. 14 to be described below (B1304).

Figure 14:
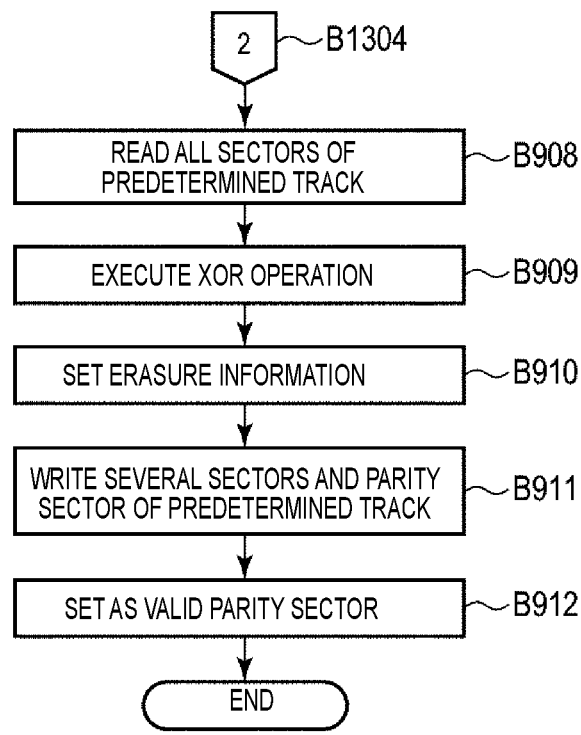
FIG. 14 is a flowchart illustrating an example of a read-modify-write process according to the second modification.

FIG. 14 is a flowchart illustrating an example of a read-modify-write process according to the second modification. When the process proceeds to B1304 in the flowchart illustrated in FIG. 13, the MPU 60 reads all sectors of a track including a monitor target sector in the disk 10 (B908) and executes an XOR operation on all sectors excluding several written sectors and the parity sector of this track (B909). The MPU 60 sets or registers erasure information in a predetermined track (B910). The MPU 60 writes all sectors including several written sectors of the predetermined track and writes (overwrites or rewrites) the result of an XOR operation on the result of the XOR operation generated in B909 and the several written sectors, as the parity sector of this track (B911). The MPU 60 sets or registers the parity sector corresponding to the predetermined track, as the valid parity sector (B912) and then ends the process.

According to the second modification, when receiving a write command to write data to a track including a monitor target sector, the magnetic disk device 1 determines whether the media cache 10b has a free space. When it is determined that the media cache 10b has the free space, the magnetic disk device 1 temporarily stores the write command (or write data) in the media cache 10b of the disk 10. When there is available processing capacity, for example, at an idle state, the magnetic disk device 1 executes read-modify-write. Therefore, since the magnetic disk device 1 temporarily stores the write command (or write data) in the media cache 10b only when data are written in the track including the monitor target sector, the deterioration of the processing performance may be prevented.

(Third Modification)

A magnetic disk device 1 of a third modification is different from the magnetic disk devices 1 of the above-described embodiment, first modification, and second modification in a read processing method. When receiving a read command to read a region including a monitor target sector, the MPU 60 reads the region including the monitor target sector designated by the read command based on erasure information and reads a track including the monitor target sector based on the erasure information, so that the monitor target sector may be efficiently corrected.

Figure 15:
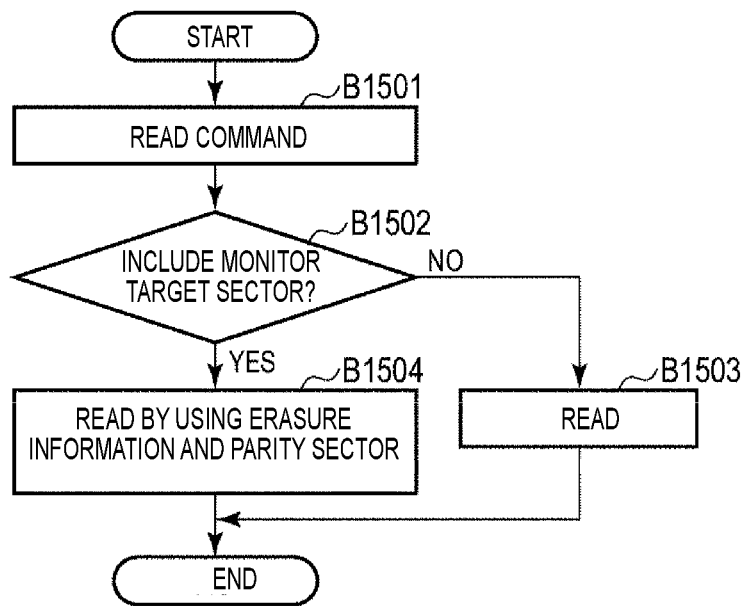
FIG. 15 is a flowchart illustrating an example of a read processing method according to a third modification.

FIG. 15 is a flowchart illustrating an example of a read processing method according to the third modification. The MPU 60 receives a read command from the host 100 (B1501). The MPU 60 determines whether a monitor target sector is included in a region designated by the read command (B1502). When it is determined that the monitor target sector is not included in the region designated by the read command ("NO" in B1502), the MPU 60 reads the region designated by the read command (B1503) and then ends the process.

When it is determined that the monitor target sector is included in the region designated by the read command ("YES" in B1502), the MPU 60 reads the region including the monitor target sector designated by the read command by using the erasure information and the parity sector (B1504) and then ends the process.

According to the third modification, when receiving a read command to read a region including a monitor target sector, the magnetic disk device 1 reads the region including the monitor target sector designated by the read command based on the erasure information and reads a track including the monitor target sector based on the erasure information, so that the correction efficiency may be improved by clearly indicating a region having a high error probability. Therefore, the magnetic disk device 1 may prevent the execution of error correction based on erroneous data written in a region where a defect, for example, a scratch, occurs.

(Fourth Modification)

A magnetic disk device 1 of a fourth modification is different from the magnetic disk devices 1 of the above-described embodiment, first modification, second modification, and third modification in a monitor target sector setting method. The MPU 60 updates a parity sector and sets or registers a monitor target sector at an idle state.

Figure 16:
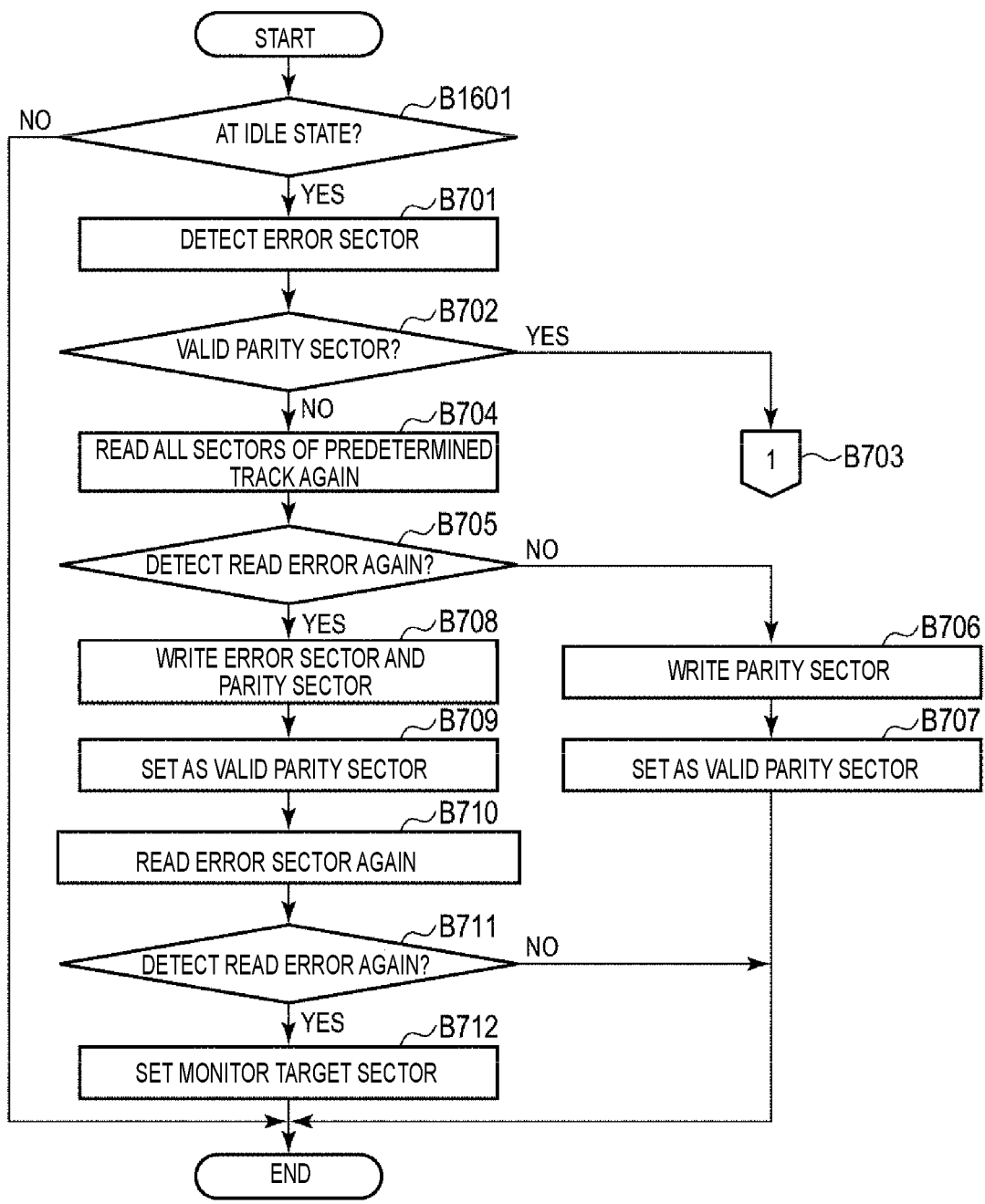
FIG. 16 is a flowchart illustrating an example of a monitor target sector setting method according to a fourth modification.

FIG. 16 is a flowchart illustrating an example of a monitoring target sector setting method according to the fourth modification. The MPU 60 determines whether it is at an idle state (B1601). When it is determined that it is not at an idle state ("NO" in B1601), the MPU 60 ends the process. When it is determined that it is at an idle state ("YES" in B1601), the MPU 60 proceeds to the process of B701.

According to the fourth modification, the magnetic disk device 1 updates a parity sector and sets or registers a monitor target sector at an idle state. Therefore, the magnetic disk device 1 may reduce the possibility that the monitor target sector cannot be read due to a defect, for example, a scratch, occurred in the disk 10 before updating the parity sector of a predetermined track.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A magnetic disk device comprising:
    a disk including a media cache and a plurality of sectors, that include sectors of a first track having a first parity sector, and sectors of a second track having a second parity sector;
    a head configured to write data on the disk and read data from the disk; and
    a controller configured to:
        detect error sectors among the plurality of the sectors and record information about the error sectors in a memory device; and
        upon receiving a write command to write first data in a first region of the first track, which is a portion of the first track, determine from the information recorded in the memory device whether the first track includes one or more of the error sectors, and in response to determining that the first track includes one or more of the error sectors, (i) perform a first XOR operation on all sectors of the first track other than one or more sectors of the first region and the first parity sector of the first track, and then, (ii) write the first data in the one or more sectors of the first region, perform a second XOR operation on the one or more sectors of the first region and the result of the first XOR operation, and write the result of the second XOR operation in the first parity sector.

2. The magnetic disk device according to claim 1, wherein the controller sets the first parity sector as a valid parity sector that is used for error correction in the first track.

3. The magnetic disk device according to claim 2, wherein, upon receiving a write command to write second data in a second region of the second track, which is a portion of the second track, the controller determines from the information recorded in the memory device whether the second track includes one or more of the error sectors, and in response to determining that the second track does not include one or more of the error sectors, writes the second data in one or more sectors of the second region.

4. The magnetic disk device according to claim 3, wherein the controller sets the second parity sector as an invalid parity sector that cannot be used for error correction in the second track.

5. The magnetic disk device according to claim 1, wherein the controller re-assigns at least one of the error sectors to the media cache when the number of error sectors are larger than a threshold value.

6. The magnetic disk device according to claim 1, wherein the controller temporarily stores the first data in the media cache prior to writing the first data in the first region.

7. The magnetic disk device according to claim 6, wherein the controller writes the first data from the media cache to the first region when the controller is in an idle state.

8. The magnetic disk device according to claim 1, wherein the controller acquires an error position and length information of the error sectors.

9. The magnetic disk device according to claim 8, wherein the controller acquires the error position and length information when the controller is in an idle state.

10. The magnetic disk device according to claim 1, wherein the controller writes to all other sectors of the first track when writing the first data in the one or more sectors of the first region.

11. A method of updating a parity sector in a magnetic disk device comprising a disk including a media cache and a plurality of sectors, that include sectors of a first track having a first parity sector, and sectors of a second track having a second parity sector, said method comprising:
    detecting error sectors among the plurality of the sectors and recording information about the error sectors in a memory device; and
    upon receiving a write command to write first data in a first region of the first track, which is a portion of the first track, determining from the information recorded in the memory device whether the first track includes one or more of the error sectors, and in response to determining that the first track includes one or more of the error sectors, (i) performing a first XOR operation on all sectors of the first track other than one or more sectors of the first region and the first parity sector of the first track, and then (ii) writing the first data in the one or more sectors of the first region, performing a second XOR operation on the one or more sectors of the first region and the result of the first XOR operation, and writing the result of the second XOR operation in the first parity sector.

12. The method according to claim 11, further comprising:
    setting the first parity sector as a valid parity sector that is used for error correction in the first track.

13. The method according to claim 12, further comprising:
    upon receiving a write command to write second data in a second region of the second track, which is a portion of the second track, determining from the information recorded in the memory device whether the second track includes one or more of the error sectors, and in response to determining that the second track does not include one or more of the error sectors, writing the second data in one or more sectors of the second region.

14. The method according to claim 13, further comprising:
    setting the second parity sector as an invalid parity sector that cannot be used for error correction in the second track.

15. The method according to claim 11, further comprising:
    re-assigning at least one of the error sectors to the media cache when the number of error sectors are larger than a threshold value.

16. The method according to claim 11, further comprising:
  temporarily storing the first data in the media cache prior to writing the first data in the first region.

17. The method according to claim 16, further comprising:
  upon detecting an idle state of processing in the magnetic disk device, writing the first data from the media cache to the first region.

18. The method according to claim 11, further comprising:
  acquiring error position and length information of the error sectors.

19. The method according to claim 11, further comprising:
  upon detecting an idle state of processing in the magnetic disk device, acquiring error position and length information of the error sectors.

20. The method according to claim 11, further comprising:
  writing to all other sectors of the first track when writing the first data in the one or more sectors of the first region.

* * * * *